(12) United States Patent
Tachizaki et al.

(10) Patent No.: US 8,359,661 B2
(45) Date of Patent: Jan. 22, 2013

(54) MAGNETIC DEVICE INSPECTION APPARATUS AND MAGNETIC DEVICE INSPECTION METHOD

(75) Inventors: Takehiro Tachizaki, Yokohama (JP); Masahiro Watanabe, Yokohama (JP); Hideaki Sasazawa, Yokohama (JP); Minoru Yoshida, Yokohama (JP); Tsuneo Nakagomi, Nakai (JP); Teruaki Tokutomi, Odawara (JP)

(73) Assignee: Hitachi High-Technologies Corporation, Tokyo (JP)

( * ) Notice: Subject to any disclaimer, the term of this patent is extended or adjusted under 35 U.S.C. 154(b) by 297 days.

(21) Appl. No.: 12/649,468

(22) Filed: Dec. 30, 2009

(65) Prior Publication Data

US 2010/0205699 A1    Aug. 12, 2010

(30) Foreign Application Priority Data

Jan. 5, 2009  (JP) .................................. 2009-000119
Aug. 10, 2009  (JP) .................................. 2009-185839

(51) Int. Cl.
*G01Q 60/52* (2010.01)

(52) U.S. Cl. ................. 850/47; 850/1; 250/306

(58) Field of Classification Search ...................... 850/47
See application file for complete search history.

(56) References Cited

U.S. PATENT DOCUMENTS 5,436,448 A * 7/1995 Hosaka et al. .................... 850/1
5,619,139 A * 4/1997 Holczer et al. ................ 324/318

FOREIGN PATENT DOCUMENTS

JP 2007-085764 4/2007
JP 2009-230845 10/2009

* cited by examiner

*Primary Examiner* — Phillip A Johnston
(74) *Attorney, Agent, or Firm* — Antonelli, Terry, Stout & Kraus, LLP.

(57) ABSTRACT

Applying an alternating current to a magnetic head as a sample generates an alternate-current magnetic field from the sample. A cantilever includes a probe that is made of a magnetic material or is coated with a magnetic material. The cantilever is displaced when it approaches the sample. Detecting the displacement of the cantilever detects distribution of the magnetic field from the sample. It is possible to fast measure distribution of the magnetic field generated from the sample when a frequency of the alternating current applied to the sample differs from a resonance frequency of the cantilever.

18 Claims, 28 Drawing Sheets

CANTILEVER SCHEMATICALLY ILLUSTRATED

NONMAGNETIC CANTILEVER

EXAMPLES OF APPLYING MAGNETIC THIN FILM (1)　(2)　(3)　(4)

EXAMPLES OF APPLYING MAGNETIC THIN FILM (1) MAGNETIC MATERIAL / CNT
(2) MAGNETIC FILM / CNT
(3) MAGNETIC NEEDLE CRYSTAL

EXCITATION
SIGNAL INPUT

EXCITATION FIELD
: FREQUENCY Nf

FORCED VIBRATION
OF CANTILEVER
: FREQUENCY Nf

CHARACTERISTIC
VIBRATION OF
CANTILEVER
: FREQUENCY f

CANTILEVER
VIBRATION DUE TO
MAGNETIC FIELD

→ t

EXCITATION FIELD
: FREQUENCY f/N

FORCED VIBRATION
OF CANTILEVER
: FREQUENCY f/N

CHARACTERISTIC
VIBRATION OF
CANTILEVER
: FREQUENCY f

CANTILEVER
VIBRATION DUE TO
MAGNETIC FIELD

LOW FREQUENCY

NEAR RESONANCE FREQUENCY (LOW FREQUENCY)

NEAR RESONANCE FREQUENCY (HIGH FREQUENCY)

HIGH FREQUENCY

FIG. 22

| MEASUREMENT PARAMETER SETUP | | |
|---|---|---|
| | 1st scan | 2nd scan |
| MODE | AFM ▼ | MFM ▼ |
| DENSITY | 10 nm/line | 4 nm/line |
| RANGE | □1 μm | □1 μm |
| SPEED | 3000 nm/s | 500 nm/s |
| FLOAT QUANTITY | — | 20 nm |
| EXCITING CURRENT FREQUENCY | — | 77 kHz |
| EXCITING CURRENT | — | 10 mA |
| EXCITATION WAVEFORM | — ▼ | SINE WAVE ▼ |
| SET POINT | 1234 | — |
| SCAN DIRECTION | 0° ▼ | 0° ▼ |

FIG. 23

| | | |
|---|---|---|
| MFM PARAMETER SETUP | | |
| FILTER TYPE | LPF ▼ | HPF ▼ |
| STOP BAND DECAY RATE (LOW-FREQUENCY SIDE) | — | 101 kHz |
| PASS BAND DECAY RATE (LOW-FREQUENCY SIDE) | — | 102 kHz |
| PASS BAND DECAY RATE (HIGH-FREQUENCY SIDE) | 98 kHz | — |
| STOP BAND DECAY RATE (HIGH-FREQUENCY SIDE) | 99 kHz | — |
| PASS BAND DECAY RATE | -0.1 dB | -0.1 dB |
| STOP BAND DECAY RATE | -60 dB | 35 dB |

FIG. 26

| NO. | width (AFM) | width (MFM) |
|-----|-------------|-------------|
| 1   |             |             |
| 2   |             |             |
| 3   |             |             |
| 4   |             |             |
| 5   |             |             |

MEASUREMENT RESULT DISPLAY

703 — NO.
704 — width (AFM)
705 — width (MFM)

5

5

MAGNETIC DEVICE INSPECTION APPARATUS AND MAGNETIC DEVICE INSPECTION METHOD

CLAIM OF PRIORITY

The present application claims priority from Japanese Patent Application JP 2009-000119 filed on Jan. 5, 2009 and JP 2009-185839 filed on Aug. 10, 2009, the content of which is hereby incorporated by reference into this application.

BACKGROUND

The present invention relates to an inspection apparatus that inspects a magnetic field generated from a magnetic device.

Means for inspecting write heads used for magnetic recording devices such as hard disks include: appearance inspection using a scanning electron microscope (SEM), an atomic force microscope (AFM), and optical means; electric inspection such as resistance measurement; and magnetic field measurement using a magnetic force microscope (MFM).

The appearance inspection using SEM is just applicable to a very small number of products as samples because an electron beam damages elements or a time loss results from vacuuming. The inspection using AFM or MFM consumes time in units of minutes when the measurement requires a resolution on the order of nanometers. The inspection is also just applicable to a very small part of products as samples.

The appearance inspection using optical means is capable of fast inspecting a shape failure in micrometers or the presence or absence of foreign particles. However, restrictions on a horizontal spatial resolution make it impossible to inspect the detailed shape of a write head or measure a magnetic field generated from the write head. The electric measurement using a head tester is widely used because the measurement can concurrently inspect many products at a time and inspect all products. The measurement has been expected to be used for a higher level of inspection because the measurement is suited for high value-added products.

Scanning probe microscopes (SPM) such as AFM and MFM two-dimensionally scan a probe along a surface under observation, making it difficult to shorten the measurement time. Various approaches have been attempted to speed up the measurement. For example, Japanese Published Unexamined Patent Application No. 2007-85764 discloses a step-in technology. Instead of two-dimensionally scanning a probe, the step-in technology discretely repeats contact with a sample and observes it only at contact points. The technology decreases observation points and aims at speeding up the observation.

As one feature, the step-in technology allows a probe to approach the sample surface approximately perpendicularly thereto, making it possible to more accurately measure steep shapes. As another feature, the step-in technology uses fewer measurement points than continuous scanning methods, making it possible to fast scan a large area.

On the other hand, the step-in technology performs discrete measurement and degrades the horizontal in-plane resolution when a large area is measured. Improving the recording density requires narrowing the write width for magnetic recording apparatuses such as hard disks, for example. Therefore, it is also necessary to narrow a writing magnetic field generated from a write head. In order to inspect and evaluate the writing magnetic field, the magnetic field detection method and the apparatus need to provide the spatial resolution of approximately one to ten nanometers precise enough to be capable of analyzing the writing magnetic field and need to be capable of measuring the magnetic field at a speed capable of inspecting all products.

SUMMARY

The above-mentioned conventional technologies such as the write head inspection method, SEM, SPM, and optical microscopes as inspection apparatuses, and the electric measurement satisfy none of the magnetic field responsiveness needed for evaluating the writing magnetic field, the horizontal spatial resolution of nanometers, and the throughput capable of inspecting all products.

It is an object of the present invention to provide an apparatus capable of measuring a magnetic field generated from a write head based on the horizontal spatial resolution of nanometers nondestructively and contactlessly at a speed capable of measuring all products during write head inspection before assembly.

According to the invention, an electric current is applied to a sample to generate a magnetic field. A cantilever contains a magnetic probe that is magnetized by the generated magnetic field and accordingly displaces the cantilever. The displacement of the cantilever is used to detect a magnetic field generated from the sample at the probe position. The cantilever having the probe is two-dimensionally scanned to measure the two dimensional magnetic field distribution.

The sample is supplied with an alternate current that deviates from a resonance frequency of the cantilever. The cantilever is designed to cause a fast attenuating forced vibration, improving the temporal responsiveness. Fast scanning is embodied without degrading the spatial resolution. It is possible to fast two-dimensionally measure magnetic fields generated from the sample.

The invention disclosed in this specification is summarized as follows.

(1) A magnetic device inspection apparatus detects a magnetic field generated from a sample. The apparatus includes: a cantilever having a magnetic material probe or a probe coated with a magnetic material; a sample base for holding the sample; displacement detection means for observing displacement at a tip of the cantilever; means capable of allowing the probe to repeatedly approach, retract, and travel in relation to the sample; and means for detecting displacement at a tip of the cantilever. The magnetic device inspection apparatus excites the sample using an alternating current at a frequency different from a resonance frequency of the cantilever and measures distribution of a magnetic field generated from the sample.

(2) A magnetic device inspection apparatus detects a magnetic field generated from a sample. The apparatus includes: a cantilever having a magnetic material probe or a probe coated with a magnetic material; a sample base for holding the sample; displacement detection means for observing displacement at a tip of the cantilever; means capable of allowing the probe to repeatedly approach, retract, and travel in relation to the sample; and means for detecting displacement at a tip of the cantilever. The magnetic device inspection apparatus excites the sample using an alternating current and measures distribution of a magnetic field generated from the sample. The apparatus further includes means for controlling a Q value of the cantilever at every measurement point when a frequency of the alternating current is equivalent to a resonance frequency of the cantilever.

(3) A magnetic device inspection apparatus detects a magnetic field generated from a sample. The apparatus includes:

a cantilever having a magnetic material probe or a probe coated with a magnetic material; a sample base for holding the sample; displacement detection means for observing displacement at a tip of the cantilever; means capable of allowing the probe to repeatedly approach, retract, and change a position relative to the sample; and means for detecting displacement at a tip of the cantilever. The magnetic device inspection apparatus excites the sample using an alternating current at a frequency different from a resonance frequency of the cantilever. The displacement detection means measures displacement at the tip of the cantilever. A frequency filter uses a measurement result for signal processing. Spatial scan of the cantilever measures distribution of a magnetic field generated from the sample.

(4) A magnetic device inspection method detects distribution of a magnetic field generated from a magnetic device and includes the steps of: setting up the magnetic device; selecting an item for inspecting the magnetic device; configuring a parameter for inspecting the magnetic device; allowing a cantilever having a probe and a position detector for sensing movement of the cantilever to approach the magnetic device; applying an exciting current to the magnetic device; determining a measurement position on the magnetic device; performing measurement in accordance with the selected inspection item and the configured parameter; analyzing magnetic field distribution data for the magnetic device resulting from the measurement and evaluating the selected item; and displaying a result of the evaluation. A frequency of the alternating current for exciting the magnetic device differs from a resonance frequency of the cantilever having the probe. The position detector measures displacement of the cantilever. A frequency filter uses a measurement result for signal processing.

These features and advantages of the invention will be apparent from the following more particular description of preferred embodiments of the invention, as illustrated in the accompanying drawings.

BRIEF DESCRIPTION OF THE DRAWINGS

FIG. 22 exemplarily shows a GUI for configuring measurement parameters according to the invention;

FIG. 23 exemplarily shows a GUI for configuring frequency filter parameters according to the invention;

FIG. 26 exemplarily shows a GUI for displaying a series of measurement results according to the invention;

DESCRIPTION OF THE PREFERRED EMBODIMENTS

Embodiments of the present invention will be described in further detail.

First Embodiment

Figure 1:
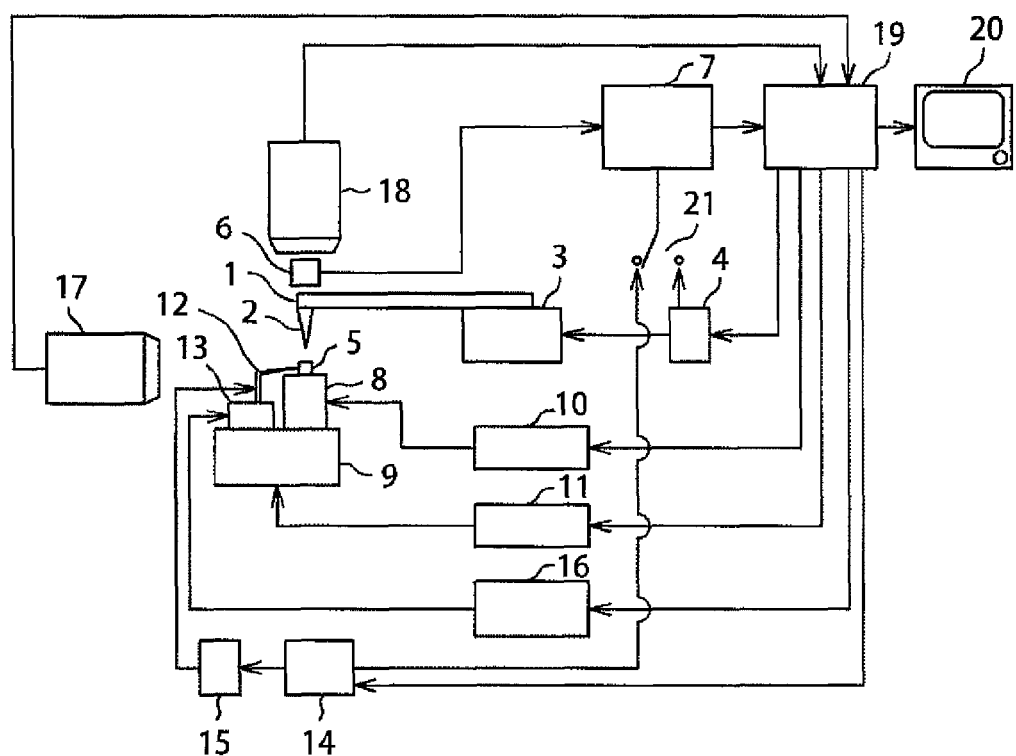
FIG. 1 exemplarily shows a basic apparatus configuration of a head inspection apparatus according to the invention.

Embodiments of the present invention will be described in further detail with reference to the accompanying drawings. Throughout the drawings, parts or components having the same performance characteristic are designated by the same reference numerals. FIG. 1 schematically shows the basic apparatus configuration of a head inspection apparatus according to the invention. As will be described later, a magnetic material is applied to or is used for at least part of a probe 2 according to the embodiment.

A cantilever 1 is fixed on a vibration element 3. An oscillator 4 excites the vibration element 3 to vibrate the cantilever 1 at a given frequency. For example, a piezoelectric element or a quartz oscillator is used for the vibration element 3. To vibrate the cantilever 1, the vibration element 3 may be replaced by means of using an elastic wave transmitted from outside a holding section for the cantilever 1, means of applying an alternating current to a capacitor including the cantilever 1 and an electrode, or means of applying an alternate magnetic field to the magnetic material provided for at least part of the cantilever 1.

When vibrated as mentioned above, the cantilever 1 allows the probe 2 to intermittently contact with the surface of a sample 5 and is capable of functioning as an AFM for measuring the physical surface shape of the sample 5. The cantilever 1 may be vibrated to function as an MFM for detecting a magnetic field that leaks out of the surface of the sample 5.

The cantilever 1 is provided with the probe 2 that vibrates at a specified frequency. The cantilever 1 approaches the surface of the sample 5 to generate an atomic force, a magnetic force, or an electrostatic force acting therebetween. Such force changes the vibration amplitude or phase of the cantilever 1. A position detector 6 measures a change in the vibration amplitude or phase of the cantilever 1. The detected change in the cantilever vibration amplitude or phase is used to detect contact of the probe 2 with the sample 5.

The position detector 6 also detects displacement at the tip of the cantilever 1 not vibrated by the oscillator 4. The displacement at the tip of the cantilever 1 can be used to detect an atomic force, a magnetic force, or an electrostatic force acting between the probe 2 and the sample 5, for example. An amplifier 7 amplifies a signal resulting from vibration or displacement at the tip of the cantilever 1 detected by the position detector 6. A lock-in amplifier may be used as the amplifier 7 to lock in to an oscillation frequency of the oscillator 4. This makes it possible to selectively acquire only signals resulting from vibration of the cantilever 1.

The sample 5 is fixed to a fine XYZ scanner. The fine XYZ scanner 8 is mounted on a coarse XYZ stage 9. The fine XYZ scanner 8 includes a piezoelectric element, for example. A fine XYZ scanner drive control section 10 controls the fine XYZ scanner 8. The fine XYZ scanner 8 features horizontal and vertical resolutions in subnanometers. The fine XYZ scanner 8 changes a gap between the tip of the probe 2 and the surface of the sample 5 and horizontal relative positions of the probe 2 and the sample 5.

Controlling a relative position between the probe 2 and the sample 5 provides two-dimensional scanning. Using the two-dimensional scanning, the position detector 6 measures displacement or vibration at the tip of the cantilever 1 to two-dimensionally map the physical quantity on or near the surface of the sample 5. The coarse XYZ stage 9 includes a ball screw and a stepping motor, for example. Further, the coarse XYZ stage 9 may represent a pneumatic stage or an ultrasonic stage. A stage drive control section 11 controls the coarse XYZ stage 9. The coarse XYZ stage 9 allows the probe 2 to coarsely approach an observation position, retracts the probe 2 after measuring the sample 5, or retracts the probe 2 and the fine XYZ scanner 8 when the sample 5 or the probe 2 is replaced.

The probe 12 is fixed to a probe base 13. A probe base 13 is mounted on the coarse XYZ stage 9. The probe 12 includes a pair of metal needles, for example. The metal needles of the pair are each connected to positive and negative electrodes of a constant current source 14. The needles apply current to an object in contact with the probe 12. A resistance measuring instrument 15 is provided between the two needles (positive and negative electrodes) of the probe 12. A resistance value varies when the probe 12 contacts with the sample 5. The resistance measuring instrument 15 reads the resistance value to detect contact of the probe 12 with the sample 5.

The resistance measuring instrument 15 may be used to measure a resistance value of the sample 5. The probe base 13 is equivalent to a stage that includes a ball screw and a stepping motor, for example. The probe base 13 moves in directions along which the probe 12 approaches and retracts from the sample 5. A probe base drive control section 16 controls the probe base 13. Two probe bases 13 may be provided. The probe 12 may be provided for each of the two probe bases 13. The probe bases 13 may be functional independently of each other and may allow the probe 12 to approach and retract from the sample 5.

There may be provided a mechanism that drives the probe base 13 parallel to the surface of the sample 5 having an electrode and changes a position where the probe 12 contacts the sample 5. The constant current source 14 outputs at least one or both of a direct current and an alternating current at any frequency to excite the sample 5. When a lock-in amplifier is used as the amplifier 7, a reference signal is introduced into the lock-in amplifier. The position detector 6 detects a signal corresponding to an amplitude or phase change in the vibration of the cantilever 1 or a displacement at the tip of the cantilever 1. At least one of these signals is used to selectively acquire responses of the cantilever due to excitation of the sample 5. A switch 21 changes the oscillator 4 to the constant current source 14.

A lateral observation system 17 includes a magnifying optical system and an imaging section. The magnifying optical system includes a microscope or a telescope, for example. The imaging section includes an imaging element such as CCD, for example. The lateral observation system 17 observes an electrode surface of the sample 5 and the tip of the probe 12. An image acquired by the imaging section is transmitted to a controller 19. The controller 19 processes the image to detect an approach between the probe 12 and the sample 5.

A longitudinal observation system 18 includes a magnifying optical system and an imaging section. The magnifying optical system includes a microscope or a telescope, for example. The imaging section includes an imaging element such as CCD, for example. The longitudinal observation system 18 observes the cantilever 1 and the sample 5. An observation result from the longitudinal observation system 18 is transmitted to the controller 19. The controller processes the image to calculate an in-lane positional difference between the probe 2 and an observation object on the surface of the sample 5. The controller 19 controls the coarse XYZ stage drive control section 11 or the fine XYZ scanner drive control section 10 to allow the probe 2 to coarsely approach an observation object region.

The longitudinal observation system 18 observes the surface of the sample 5 to provide appearance inspections for a foreign particle or a shape failure. The longitudinal observation system 18 is capable of both bright-field observation and dark-field observation. The bright-field observation inspects the sample 5 for an external appearance failure in micrometers. The dark-field observation detects foreign particles and defects in the range of several tens to hundreds of nanometers. The longitudinal observation system provides results from the bright-field observation and the dark-field observation. As will be described later, the results may be used when the probe 2 observes the sample 5 along its surface. The probe 2 can avoid a foreign particle or a defect if any while scanning. It is possible to prevent the tip of the probe 2 from being damaged due to contact with the foreign particle or the defect.

The controller 19 acquires displacement information about the vibration amplitude, the phase, or the tip of the cantilever 1 from the amplifier 7. The controller 19 also acquires a resistance value between the positive and negative electrodes of the probe 12 from the resistance measuring instrument 15. The controller 19 further acquires observation results from the lateral observation system 17 and the longitudinal observation system 18. The controller 19 controls the oscillator 4, the fine XYZ scanner drive control section 10, the stage drive control section 11, the constant current source 14, and the probe base drive control section 16.

The controller 19 can sweep an oscillation frequency of the oscillator 4. The controller 19 can continuously vary a vibration frequency of the cantilever 1 to find a resonance frequency of the cantilever 1. The controller 19 controls the fine XYZ scanner 8 to vary a relative position between the probe 2 and the sample 5. The controller 19 acquires vibration amplitude changes or vibration phase changes at given points of the cantilever 1 or acquires displacement at the tip of the cantilever 1 to generate a two-dimensional image. The controller 19 allows a display unit 20 to display the image.

Figure 2A:
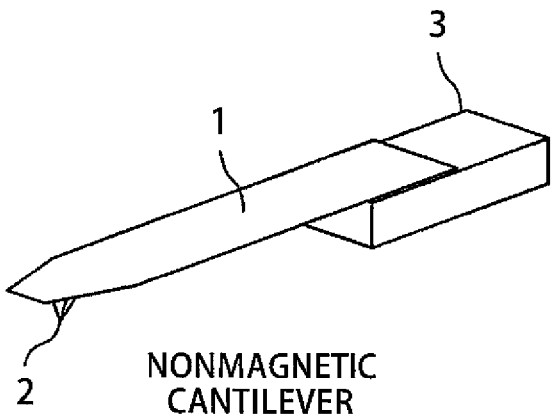
FIGS. 2A to 2C exemplarily show a magnetic probe used for the head inspection apparatus according to the invention.
Figure 2B:
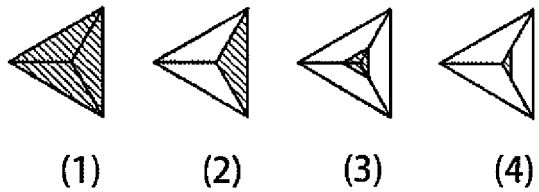
Figure 2C:
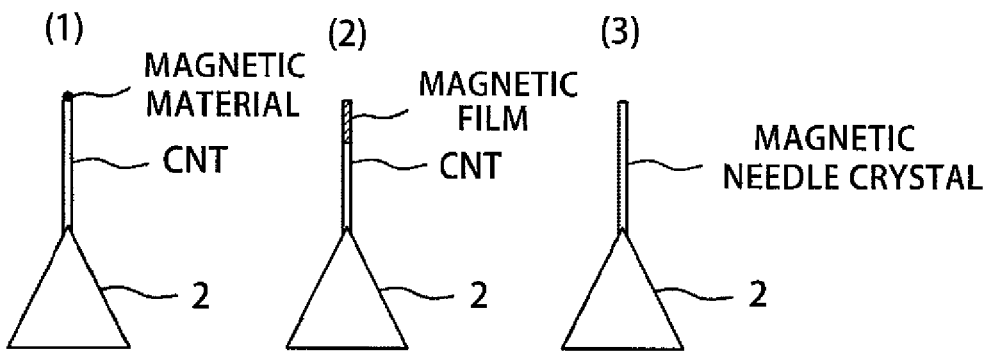

FIGS. 2A to 2C schematically show the cantilever 1 and the probe 2. The probe 2 is provided at the tip of the cantilever 1. A semiconductor microfabrication technique is used to shape the probe 2 into a circular cone or a pyramid. The probe 2 is sharply tipped in nanometers. The probe 2 detects a magnetic field that leaks from the surface of the sample 5 or is generated by applying an electric current to the sample 5. In order to achieve it, a magnetic material is used for at least part of the tip of the probe 2 or is bonded to at least part of the tip.

FIG. 2B shows examples of bonding magnetic materials. FIG. 2B (1) shows an example of covering the entire surface of the probe 2 with the magnetic material. FIG. 2B (2) shows an example of bonding the magnetic material to one side of the pyramid probe. FIG. 2B (3) shows an example of bonding the magnetic material to only the tip of the probe. FIG. 2B (4) shows an example of bonding the magnetic material to only the tip of one side of the pyramid probe. The method of bonding the magnetic material is not limited to these examples.

The probe 2 itself may be made of a magnetic material and may be shaped into a pyramid or a circular cone. When the probe 2 is made of a magnetic material, the magnetic material may be used for at least part of the tip. As shown in FIG. 2C (1), the probe 2 may be tipped with a carbon nanotube (CNT) that may be tipped with a fine magnetic material. As shown in FIG. 2C (2), the magnetic material may be applied to at least part of the CNT tip surface. As shown in FIG. 2C (3), the probe 2 may be tipped with a needle-shaped magnetic material that has a radius on the order of nanometers and is formed in accordance with crystal growth.

A hard magnetic material or a soft magnetic material is bonded to the probe 2. The hard magnetic material includes ferrite and cobalt alloys such as nickel-cobalt alloy and cobalt platinum alloy. The soft magnetic material includes iron, nickel, and Permalloy. When the hard magnetic material is bonded to the probe 2, the probe 2 is magnetized in a specified magnetic field before measurement of a sample. This facilitates calibration of measurement results.

The magnetization condition of the probe 2 is unaffected by a magnetic field generated from the sample 5 during measurement. Measurement results can be easily interpreted. Bonding a soft magnetic material to the probe enables measurement without disturbing the magnetic field of an object under measurement. The use of soft magnetic materials is suited for measurement of weak magnetic fields. On the other hand, the magnetization condition of a soft magnetic material depends on a magnetic field generated from the sample 5. A response becomes nonlinear in accordance with the magnetic field generated from the sample 5. Calibration of measurement results becomes more difficult than the use of hard magnetic materials.

Figure 3A:
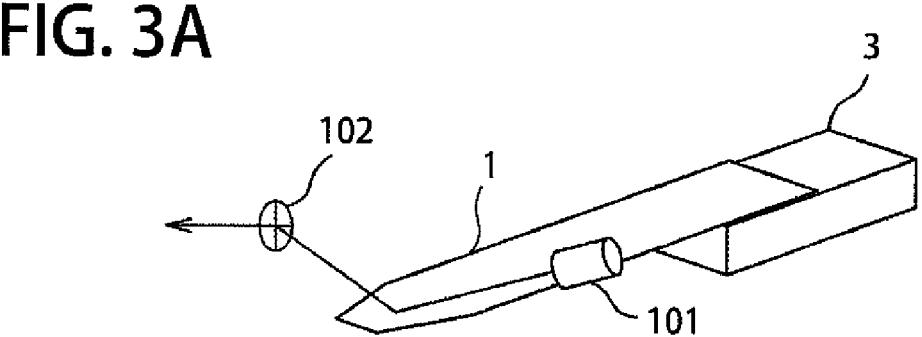
FIGS. 3A to 3D exemplarily show a position detection apparatus that measures vibration or displacement at the tip of a cantilever according to the invention.
Figure 3B:
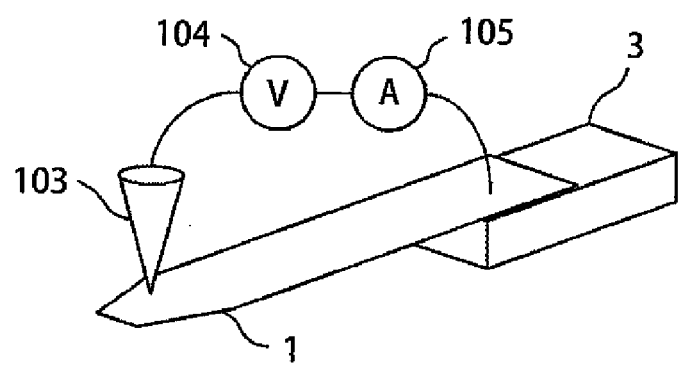
Figure 3C:
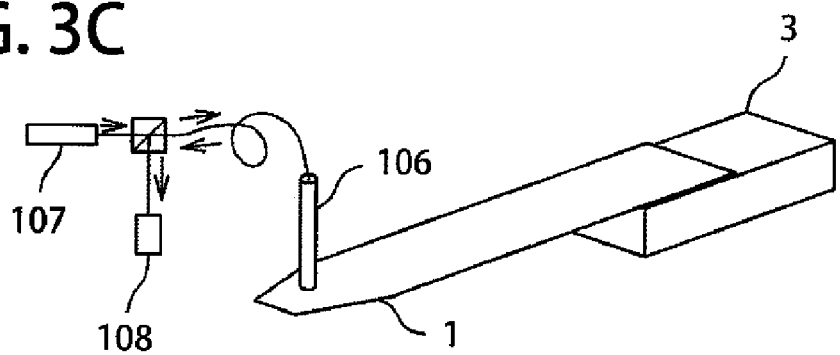
Figure 3D:
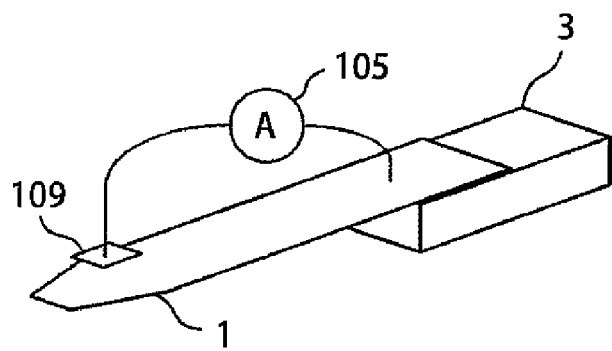

With reference to FIGS. 3A to 3C, the following describes in detail actual configurations of the position detector 6 shown in FIG. 1. FIG. 3A shows a configuration example of the detection apparatus using an optical lever. FIG. 3B shows a configuration example of the detection apparatus using a metal needle. FIG. 3C shows a configuration example of the detection apparatus using near-field light. FIG. 3D shows a configuration example of the detection apparatus using a capacitance sensor.

According to the position detector 6 using the optical lever in FIG. 3A, a laser light source 101 radiates measurement light to the tip of the cantilever 1. A division light detector 102 detects the reflected light. The cantilever 1, when displaced, deflects the reflected light of the measurement light and changes an incident position at the division light detector 102.

The position detector 6 measures variations in the incident position of the reflected light using output from the division light detector 102, making it possible to detect displacement at the tip of the cantilever 1. The division light detector 102 is equivalent to a four-division photodiode or a position sensor (PSD), for example. The position detection apparatus using the metal needle in FIG. 3B allows a power supply 104 to apply a bias voltage between the metal needle 103 and the cantilever 1. An ammeter 105 measures a current flowing between the metal needle 103 and the cantilever 1 to find a gap between the metal needle 103 and the cantilever 1. The configuration and the position detection principle of the position detection apparatus comply with the height detection principle of scanning tunnel microscopes.

When the position detection apparatus is used, a gap between the cantilever 1 and the metal needle 103 needs to remain vacuum. The position detection apparatus makes it possible to notify a height change of the cantilever 1 in units of nanometers. The position detection apparatus using the near-field light in FIG. 3C includes an optical fiber head 106 tipped with a nanometer-sized opening, a light source 107, and a light detector 108, for example.

Light from the light source is introduced to the optical fiber head 106. Near-field light leaks from the fine opening at the tip of the optical fiber head 106 and reflects on the cantilever 1. The light detector 108 detects the reflected light. The near-field light leaking from the fine opening indicates an intensity dependent on the distance from the fine opening. The reflected light intensity, when monitored, indicates a gap between the cantilever 1 and the fine opening.

The configuration and the position detection principle of the position detection apparatus comply with the height detection principle of scanning near-field light microscopes. The light detector 108 represents a photodiode, photomultiplier tube, solid-state imaging element such as CCD, avalanche photodiode, and the like. According to the position detection apparatus using the capacitance sensor as shown in FIG. 3D, for example, an electrode 109 is provided very approximately to the cantilever 1 so as to be parallel to the surface of the cantilever 1. The ammeter 105 is connected between the electrode 109 and the cantilever 1. According to this detection technique, the cantilever 1 and the electrode 109 configure a capacitor. The capacitance of the capacitor varies with a variation in the gap between the cantilever 1 and the electrode 109. The variation in the capacitor of the capacitor, when monitored, is used to detect displacement of the cantilever 1.

Figure 4A:
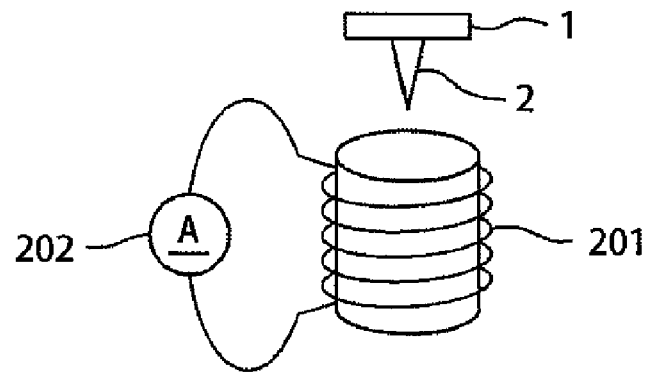
FIGS. 4A to 4C exemplarily show an apparatus that calibrates magnetization condition of a magnetic probe according to the invention.

FIG. 4 schematically shows mechanism of magnetizing the probe 2. FIG. 4A shows an example of magnetizing the probe 2 using an electric magnet 201. The electric magnet 201 includes a coil that is formed by winding an electric wire around a soft magnetic material such as iron or Permalloy. A direct-current voltage is applied to both ends of the coil from a power supply 202 to generate a specified magnetic field and magnetize the probe 2.

Figure 4B:
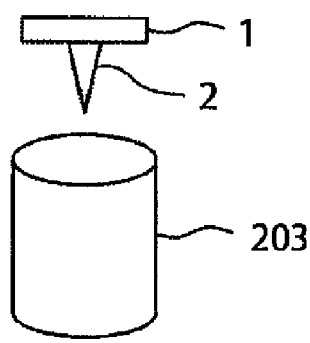

The intensity of the magnetic material generated from the electric magnet 201 is higher than a holding force of the magnetic material used for the probe 2 so as not to damage the tip of the probe 2. As shown in FIG. 4B, a permanent magnet 203 such as a neodymium magnet may be used to magnetize the probe 2. The probe 2 approaches and retracts from the electric magnet 201 or the permanent magnet 203 always in a constant direction so as to ensure a constant magnetization direction for the probe 2. The approaching and retracting direction is preferably perpendicular to the surface of the cantilever 1 provided with the probe 2 so as to correspond to the magnetization direction of the probe 2.

Figure 4C:
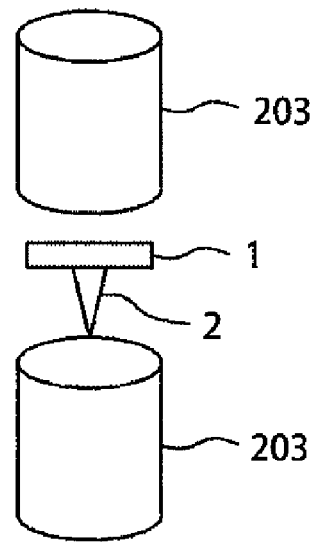

When the electric magnet 201 or the permanent magnet 203 magnetizes the probe 2 as shown in FIG. 4C, the electric magnets 201 or the permanent magnets 203 may be positioned opposite to each other for evenly magnetizing the probe 2. This can reduce magnetization direction variations in the probe 2. In order to always ensure constant measurement results, the probe 2 is magnetized as mentioned above each time the probe is replaced. Alternatively, the probe 2 is magnetized periodically. Preferably, the probe 2 is magnetized before a new sample is measured. The probe 2 may measure a magnetic field generated from the electric magnet 201 or the permanent magnet 203. This makes it possible to calibrate the sensitivity of the probe 2 or a measurement result from the probe 2.

Figure 5A:
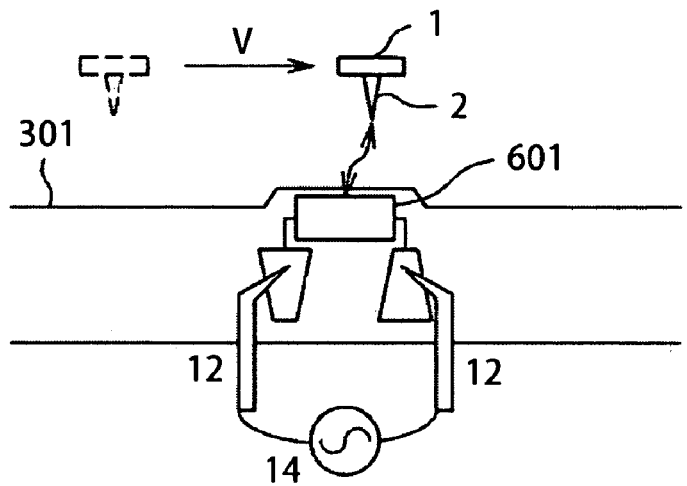
FIGS. 5A to 5D schematically show the principle of measuring a magnetic field generated from a head according to the invention.

FIGS. 5A to 5D illustrate the principle of magnetic field detection using the cantilever 1 provided with the magnetic probe according to the invention with reference to an example of measuring a magnetic field generated from a write head 601 for a hard disk. FIG. 5A schematically shows a sectional view of a sample containing the write head 601, the cantilever 1 and the probe 2 capable of scanning, the probe 12, and the constant current source 14. The probe 12 makes electric contact with the sample. The constant current source 14 applies a current to excite the sample 5.

As shown in FIG. 5A, the cantilever 1 is not vibrated and is moved for scanning. The magnetized probe 2 approaches the write head 601. A magnetic field generated from the write head 601 acts on the magnetized probe 2 or the magnetic material bonded to the probe 2 to displace the tip of the cantilever 1. The tip of the cantilever 1 is displaced by an attractive force or a repulsive force resulting from the magnetization condition of the probe 2 and the excitation of the write head 601. The position detector 6 detects the displacement of the tip of the cantilever 1.

Figure 5B:
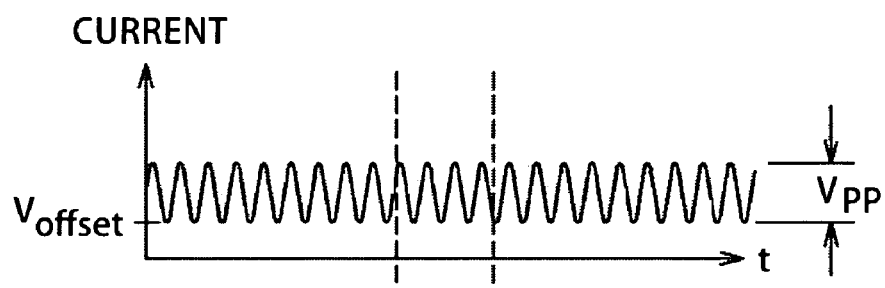
Figure 5C:
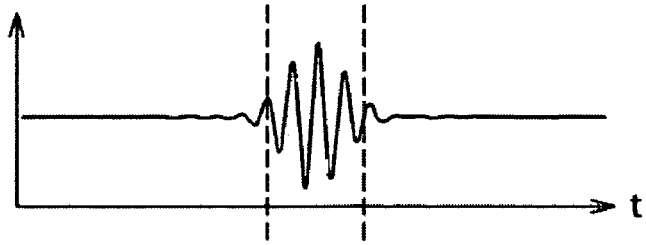
Figure 5D:
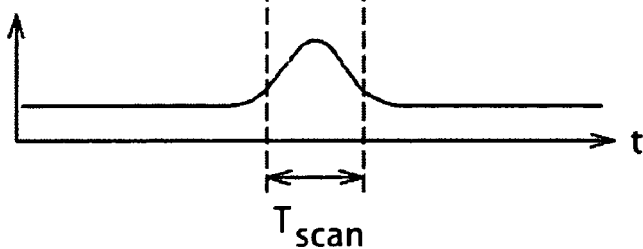

When an alternating current is applied to the write head 601 as shown in FIG. 5B, the write head 601 generates an alternate magnetic field to vibrate the tip of the cantilever 1. As schematically shown in FIG. 5C, the abscissa axis represents scan time for the probe 2. When the cantilever 1 scans near the surface of the sample 5, the probe 2 approaches the write head 601. A magnetic field generated from the write head 601 starts vibrating the cantilever 1. The cantilever 1 continues vibrating for time Tscan during which the cantilever 1 passes over the write head 601. After passing over the write head 601, the cantilever 1 stops vibrating. FIG. 5D shows a displacement amplitude detected at the tip of the cantilever 1. A writing magnetic field width is estimated based on Tscan.

As mentioned above, the alternating current is supposed to be applied to the write head 601 to vibrate the cantilever 1. When the alternating current frequency is equivalent to the resonance frequency of the cantilever 1, the vibration of the cantilever 1 depends on a Q value of the cantilever 1. In this case, the cantilever 1 resonates and therefore causes a large vibration at the tip. In addition, the large Q value enables long continued vibration without attenuation (e.g., td in FIG. 6A). A large signal can be acquired.

Figure 6A:
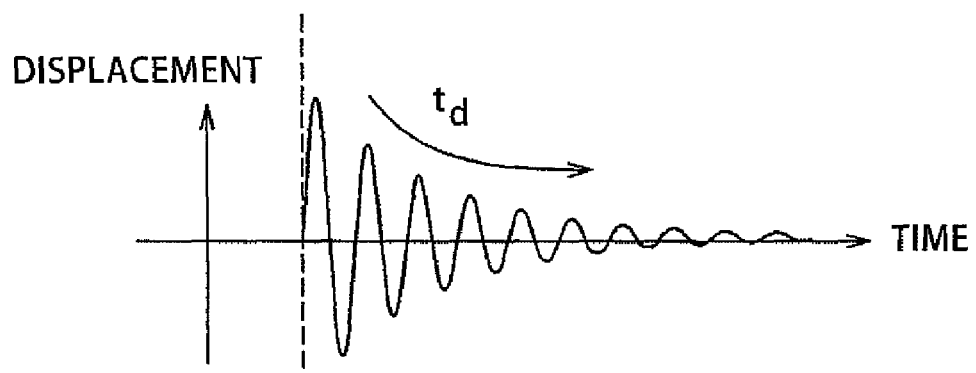
FIGS. 6A and 6B schematically show vibration of a cantilever according to the invention at its tip.
Figure 6B:
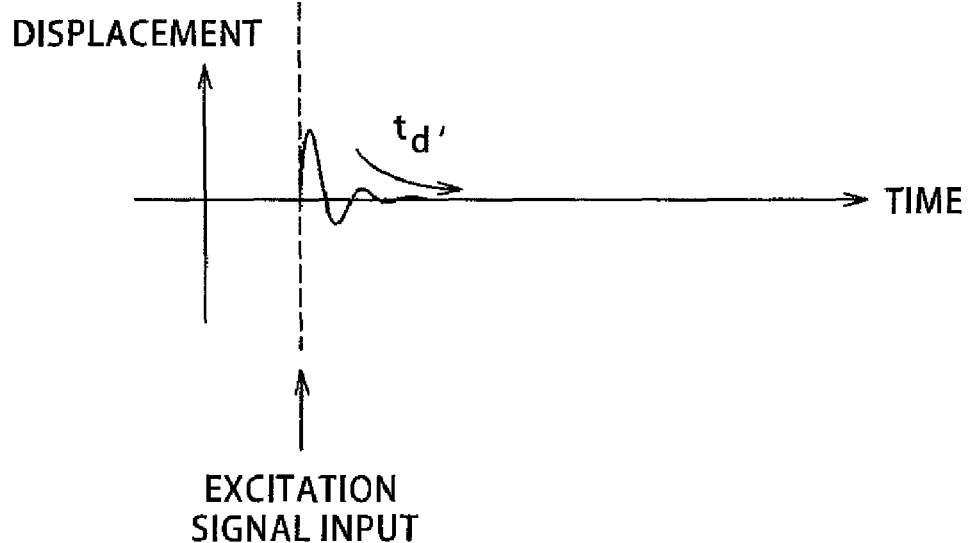

As mentioned above, the alternating current is supposed to be applied to the write head 601 to vibrate the cantilever 1. The alternating current frequency may be out of the resonance frequency of the cantilever 1. Alternatively, the Q value of the cantilever 1 may be controlled to be small when the position detector 6 measures speed information about the cantilever 1 and feeds the information back to the oscillator 4, for example. In such cases, the vibration amplitude shown in FIG. 6B becomes smaller than that excited at the resonance frequency as shown in FIG. 6A. Time constant td' becomes short.

The excitation independent of resonance provides excellent temporal responsiveness. It is preferable to ensure relation td'<1/r between the time constant td' and sampling frequency r of the position detector 6 at every measurement point. The cantilever 1 is capable of measurement through scanning without degrading the spatial resolution. Shortening td' improves the high responsiveness and enables the probe 2 to scan faster.

The frequency of a current applied to the write head 601 may be out of the resonance frequency of the cantilever 1. In this case, a magnetic field generated from the sample 5 is used to forcibly vibrate the cantilever 1. The vibration of the cantilever 1 contains a vibrational component of the exciting current frequency and a vibrational component of the natural vibration of the cantilever 1.

Information about the magnetic field generated from the sample 5 can be acquired by extracting the exciting current frequency of the sample 5 from the vibration of the cantilever 1. Specifically, FIG. 12 or 13 shows vibrations when the frequency exciting the sample 5 is N times or one Nth time natural frequency f of the cantilever 1, where N is an integer equal to or greater than 2. As an advantage, the lock-in detection time can be shortened when the exciting current frequency is equivalent to N or 1/N multiplied by the natural frequency f of the cantilever 1.

Figure 12A:
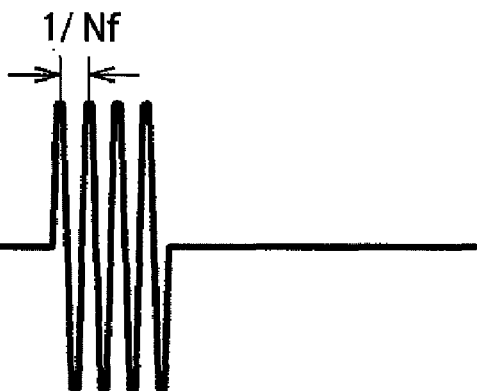
FIG. 12A to 12D schematically show displacement at the cantilever tip and the waveform which excites the sample magnetically according to the invention.
Figure 12B:
Figure 12C:
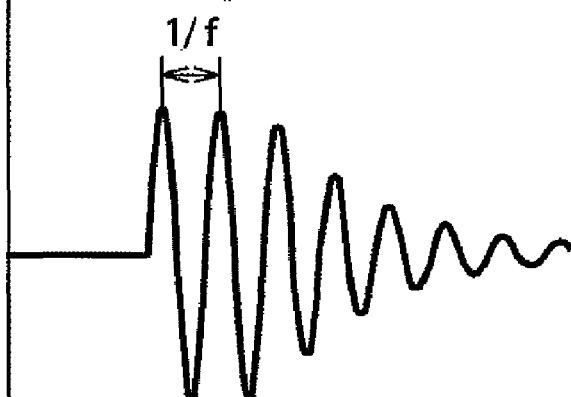
Figure 12D:
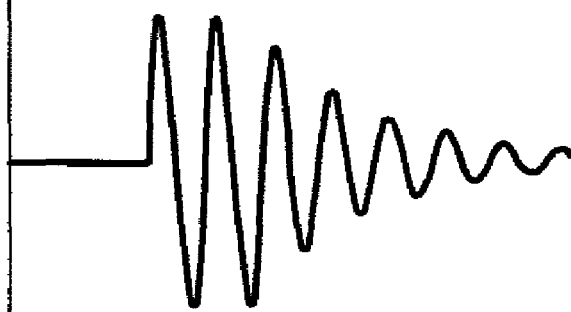

FIG. 12A schematically shows an exciting current waveform when frequency Nf excites the sample. FIG. 12B schematically shows forced vibration of the cantilever 1 excited by an exciting magnetic field. FIG. 12C schematically shows natural vibration of the cantilever 1 with frequency f induced by an exciting magnetic field. FIG. 12D schematically shows vibration of the cantilever 1 induced by an exciting current at frequency Nf (synthesis of the forced vibration in FIG. 12B and the resonance in FIG. 12C).

In FIG. 12B, the cantilever vibration differs from the resonance frequency. The cantilever stops vibrating at the same time as the excitation stops. A lock-in detection technique may be used to extract amplitude of the forced vibration from the waveform shown in FIG. 12D. The technique integrates sine waves at frequency Nf and yields a moving average. Not only sine waves but also cosine waves may be integrated. An optional phase may be used.

Figures 13A, 13B, 13C, 13D:
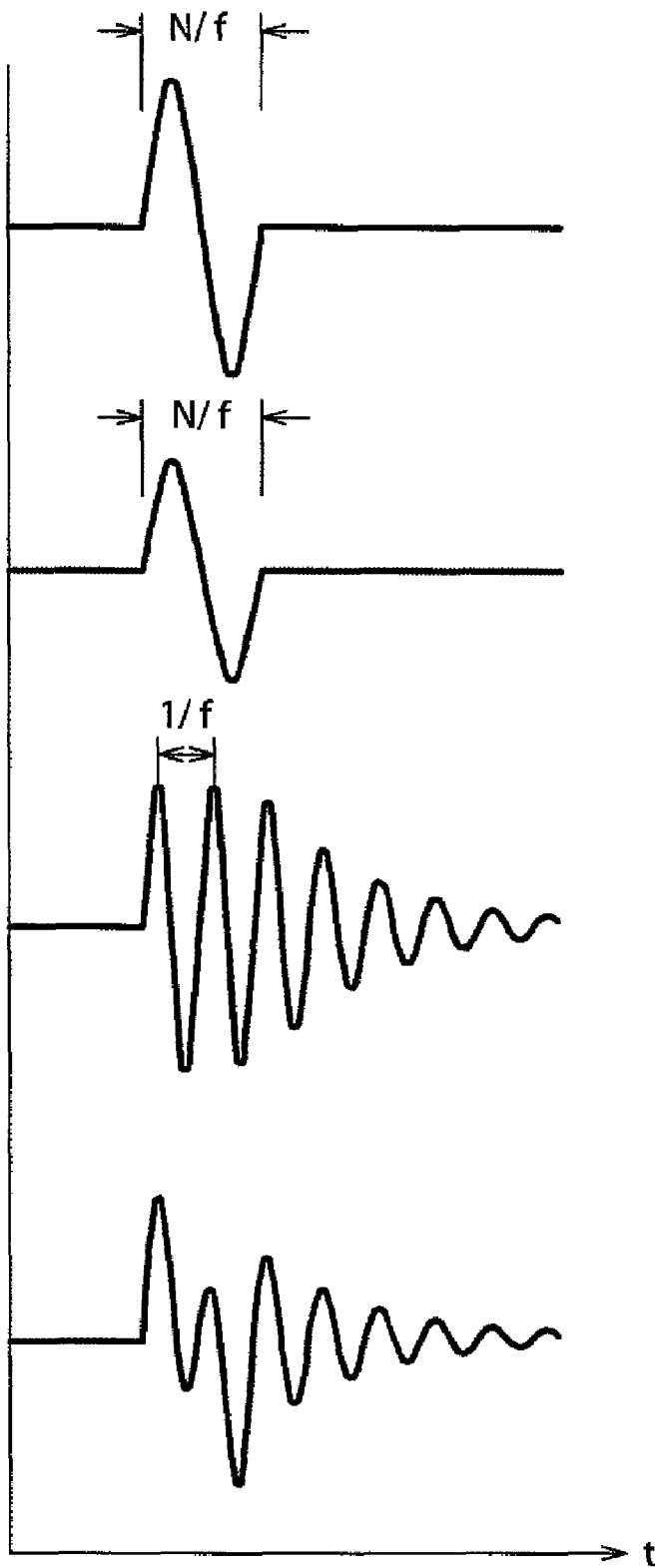
FIG. 13A to 13D schematically show displacement at the cantilever tip and the waveform which excites the sample magnetically according to the invention.

FIG. 13A schematically shows an exciting current waveform when frequency f/N excites the sample. FIG. 13B schematically shows forced vibration of the cantilever 1 excited by an exciting magnetic field. FIG. 13C schematically shows natural vibration of the cantilever 1 with frequency f induced by an exciting magnetic field. FIG. 13D schematically shows vibration of the cantilever 1 induced by an exciting current at frequency f/N (synthesis of the forced vibration in FIG. 13B and the resonance in FIG. 13C).

When the sample is excited N times the natural frequency f of the cantilever 1 as shown in FIG. 12, lock-in detection may be performed so as to extract an exciting current frequency component Nf. In this case, it is possible to balance positive and negative components of the frequency f not containing the exciting current frequency signal even when the lock-in integration time is shortened up to 1/f. A signal excellent in the signal-to-noise ratio can be acquired.

As shown in FIG. 13, the exciting current frequency f becomes 1/N time the natural frequency f of the cantilever 1. In this case, the integration time of N/f can be used to remove natural vibration components of the cantilever 1. A signal excellent in the signal-to-noise ratio can be acquired even when the integration time is shortened up to N/f during the lock-in detection. Means for applying current as shown in FIG. 12 or 13 can vibrate the cantilever 1 using the frequency of a current applied to the write head 601. The frequency f or f/N can be used to detect only the vibration and therefore acquire signals. This makes it possible to acquire an image even when the cantilever 1 scans fast.

Figure 14A:
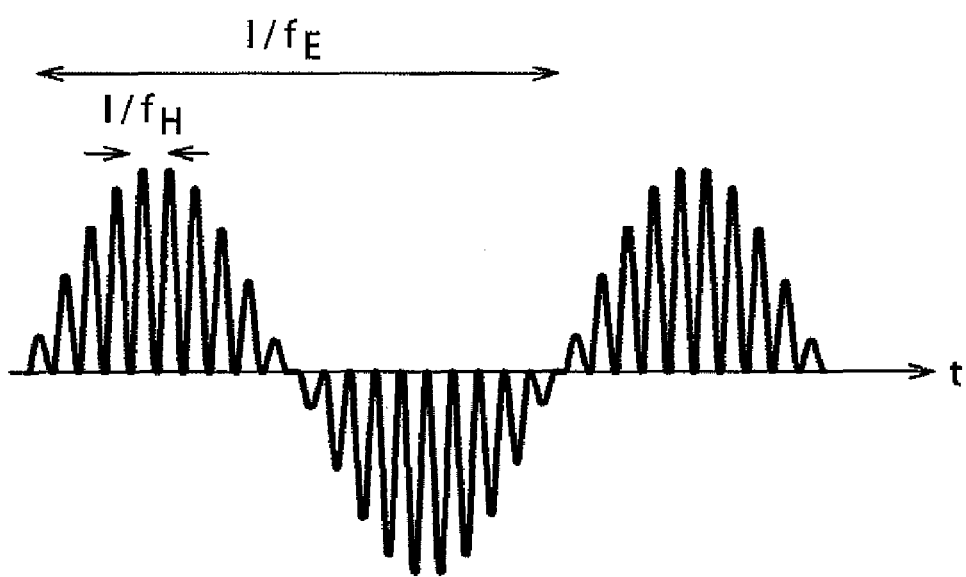
FIGS. 14A and 14B schematically show waveforms of an exciting current applied to the sample according to the invention.
Figure 14B:
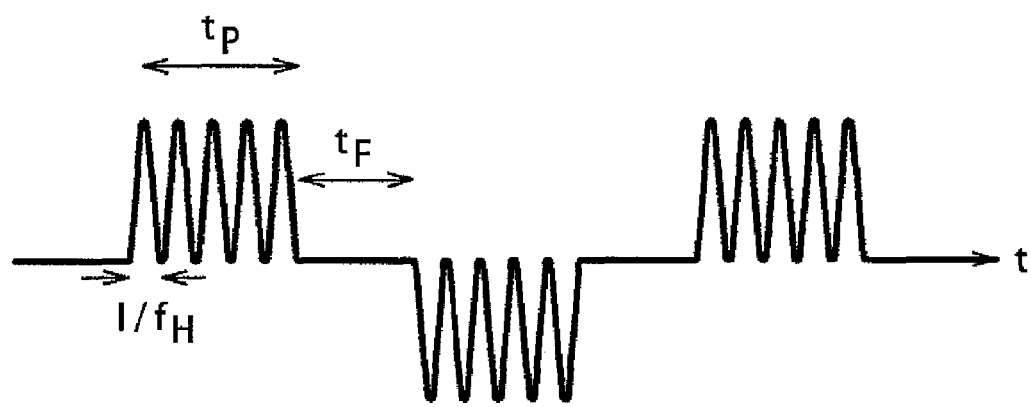

An exciting current may be applied as shown in FIGS. 14A and 14B. FIG. 14A shows a method of exciting the sample 5 at frequency fH in accordance with actual usage and modulating the amplitude at frequency $f_E$. Since the sample 5 is excited at fH, it is possible to generate the same magnetic field as that generated during actual usage. The cantilever 1 can detect an envelope curve modulated by frequency $f_E$ even when the cantilever 1 cannot vibrate in accordance with fH. Frequency fE actually determines the magnetization condition of the sample 5, for example. When the sample is excited at the actually used high frequency fH, it is possible to measure the magnetization condition under the actually used physical state, for example.

FIG. 14B shows a method of exciting the sample 5 at fH in accordance with actual usage and intermittently modulating the excitation amplitude. The method can generate the same magnetic field as that actually generated for exciting the sample 5 at fH. The excitation continuing during tp can displace the cantilever 1 and detect a magnetic field even when the cantilever 1 cannot vibrate in accordance with the magnetic field that is generated at the frequency fH. Continued exciting time tp and non-exciting time tF can be set to any values so as to ensure a large signal under the condition that the probe 2 does not contact the sample 5.

When an exciting current is applied as shown in FIGS. 14A and 14B, the exciting frequency fH does not cause the cantilever to vibrate accordingly. When the current amplitude is applied in the range of +V and −V without offset, a magnetic force acting on the cantilever 1 becomes zero on average. The cantilever 1 is not excited. When a high frequency is used for excitation, a current with offset needs to be applied as shown in FIGS. 14A and 14B.

Figure 15:
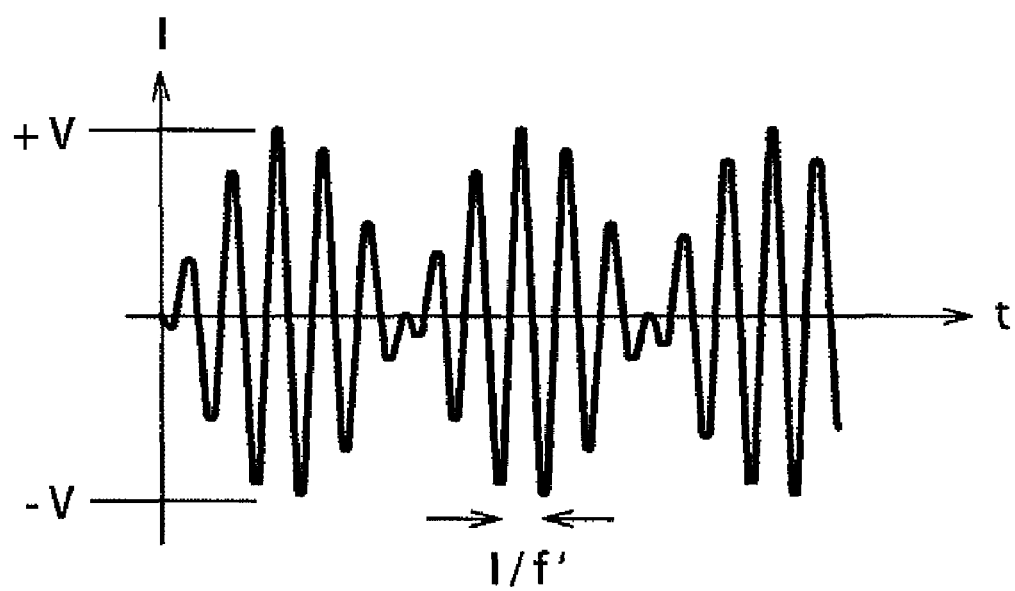
FIG. 15 schematically shows a waveform of an exciting current not exciting the cantilever according to the invention.

Let us suppose that a soft magnetic material is bonded to the probe 2 or forms at least part thereof. When the exciting current at frequency f' without offset is applied for exciting the sample 5 as shown in FIG. 15, the cantilever 1 vibrates at 2f'. This is because the soft magnetic material is magnetized in parallel with and in proportion to an external magnetic field. The magnetic force acting on the probe 2 is proportional to the square of an external magnetic field. Force F acting on the soft magnetic material bonded to the cantilever is proportional to H×B, a product of magnetic field H and magnetization B for the soft magnetic material. B is proportional to H because the soft magnetic material is magnetized to the external magnetic field. Therefore, the force F applied to the cantilever is proportional to the square of the magnetic field H. In this case, the cantilever 1 is assumed to be capable of following frequency f' or 2f'.

The lock-in detection is performed to remove the vibration of the cantilever 1 when the excitation is performed without offset as shown in FIG. 15. In this case, the frequency of the exciting alternating current is assumed to be N/2 times or one 2N-th the resonance frequency f of the cantilever 1 having the probe 2. It is assumed that frequency f results from the natural vibration of the cantilever 1 and does not contain an exciting current frequency signal. Positive and negative components of the frequency f can be balanced with each other even when the lock-in integration time is shortened up to 1/f. A signal excellent in the signal-to-noise ratio can be acquired. When the soft magnetic material is used for the probe 2, applying an exciting current with offset as shown in FIG. 14A or 14B causes the cantilever 1 to vibrate at frequency $f_E$ equivalent to the carrier amplitude.

There may be a case where the sample 5 generates a strong magnetic field and the hard magnetic material bonded to the probe 2 or forming part thereof behaves as a soft magnetic material. In such case, applying an alternating current at the frequency f' without offset as shown in FIG. 15 to the sample 5 causes the cantilever 1 to vibrate at frequency 2f'.

The lock-in detection is performed to remove the vibration of the cantilever 1. In this case, the frequency of the exciting alternating current is assumed to be N/2 times or one 2N-th the resonance frequency f of the cantilever 1 having the probe 2. It is assumed that frequency f results from the natural vibration of the cantilever 1 and does not contain an exciting current frequency signal. Positive and negative components of the frequency f can be balanced with each other even when the lock-in integration time is shortened up to 1/f. A signal excellent in the signal-to-noise ratio can be acquired.

There may be a case where the sample 5 generates a strong magnetic field and the hard magnetic material bonded to the probe 2 or forming part thereof behaves as a soft magnetic material. In such case, applying an exciting current with offset as shown in FIG. 14A or 14B to the sample 5 causes the cantilever 1 to vibrate at the frequency fH of the carrier.

The lock-in detection is performed to remove the vibration of the cantilever 1. In this case, the frequency of the exciting alternating current is assumed to be N times or one Nth the resonance frequency f of the cantilever 1 having the probe 2. It is assumed that frequency f results from the natural vibration of the cantilever 1 and does not contain an exciting current frequency signal. Positive and negative components of the frequency f can be balanced with each other even when the lock-in integration time is shortened up to 1/f. A signal excellent in the signal-to-noise ratio can be acquired.

Figure 28:
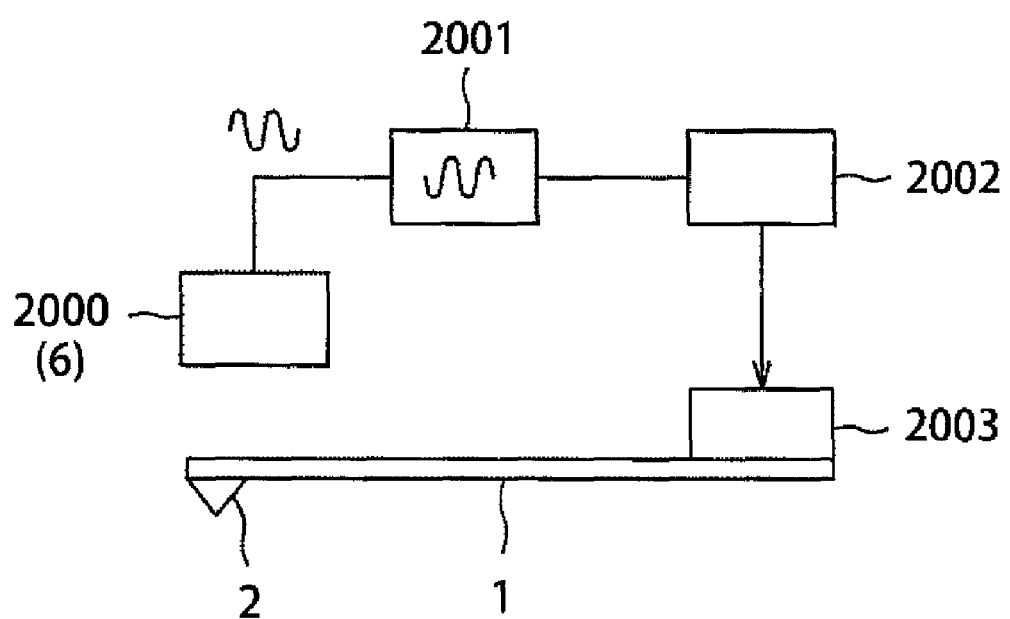
FIG. 28 schematically shows a system that forcibly suppresses a cantilever resonance.

There may be a case where a frequency for exciting the sample 5 inevitably equals the resonance frequency of the cantilever 1. In this case, the time constant needs to be forcibly restrained from increasing due to resonance of the cantilever 1. FIG. 28 shows a method for this. In FIG. 28, the cantilever 1 is provided with a piezoelectric element 2003. The piezoelectric element 2003 can control vibration of the cantilever 1. The piezoelectric element 2003 may be replaced by the vibration element 3 in FIG. 1.

In FIG. 28, a vibration monitor 2000 is provided above the cantilever 1 so as to detect motion of the cantilever 1. The vibration monitor 2000 may be replaced by the position detector 6 in FIG. 1. A phase shifter 2001 varies a vibration waveform phase so as to generate an opposite phase with reference to the phase of a vibration waveform detected by the vibration monitor. An alternating current power supply 2002 transmits a signal to the piezoelectric element 2003 so as to ensure the phase varied by the phase shifter 2001. The piezoelectric element 2003 generates a vibration to restrain the vibration of the cantilever 1 and ends the vibration of the cantilever 1 in a short period of time. The method can also end the vibration of the cantilever 1 in a short period of time when different exciting current frequencies are used for the sample 5 at measurement points.

Figure 7A:
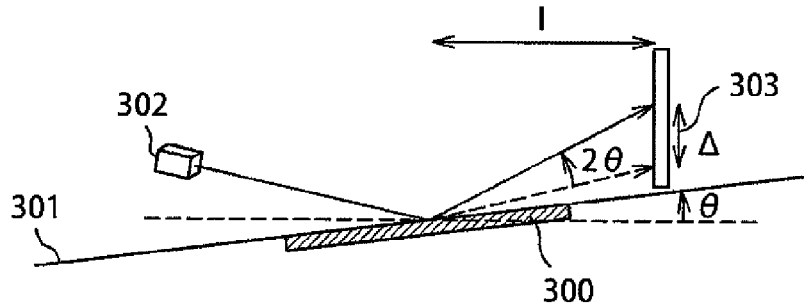
FIGS. 7A to 7C exemplarily show an apparatus that measures the surface tilt of a sample according to the invention.

FIG. 7 exemplarily shows a technique for measuring the tilt of a surface 301 of the sample 5. The surface 301 of the sample 5 is measured for the tilt before the magnetized probe 2 is used for scanning. FIG. 7A shows a tilt measurement method using an optical lever. A light source 302 radiates light to an observation region 300 from obliquely upward. A light receiving element 303 converts the reflected light into an electric signal. An incident position of the light is used to find angle θ of the sample surface 301. The slant θ of the sample surface 301 can be calculated using: distance λ between the incident position of the radiated measurement light on the sample surface and the light receiving element 303; and displacement Δ of the incident light position on the light receiving element 303. The light source 302 generates laser or white light as the measurement light.

The light receiving element 303 represents imaging elements such as a line sensor, two-dimensional CCD array, and position sensitive sensor. The slant measurement of the sample surface 301 according to the technique requires acquiring height information at the incident position of the radiated measurement light so as to correctly identify a height variation and the slant of the sample surface 301. When slant angle q needs to be accurate, another means needs to be used to acquire the height information at the incident position of the radiated measurement light.

Figure 7B:
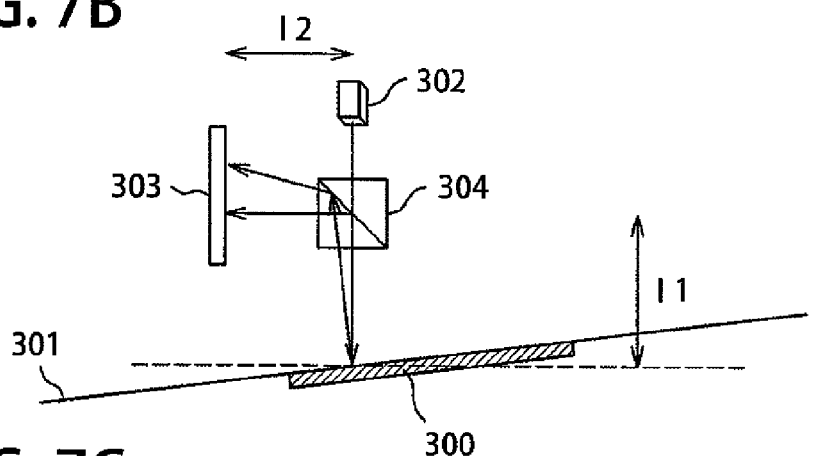

FIG. 7B shows another technique for optically measuring the slant. According to the measurement method shown in FIG. 7B, the light source 302 radiates measurement light to the observation region 300 from above the sample surface 301. A beam splitter 304 bends the reflected light. The light receiving element 303 converts the light into an electric signal. The incident position of the light is used to measure the slant of the sample surface 300.

According to the method, tilting the sample surface 300 at angle θ tilts the reflected light for the measurement light at angle 2θ. The distance between the sample surface 300 and the light receiving element 303 can be used to find the tilt of the sample surface 300. The technique can measure the slant of the sample surface 301 without using the height information about the sample surface 301 where the measurement light is radiated.

The light source 302 according to the technique generates laser or white light as the measurement light. The light receiving element 303 represents imaging elements such as a line sensor, CCD array, and position sensitive sensor. A two-dimensional CCD array, when used as the light receiving element 303, can simultaneously measure slants of the sample surface 301 according to revolution around the x-axis and the z-axis in orthogonal coordinates as shown at the bottom right in FIGS. 7A to 7C.

Figure 7C:
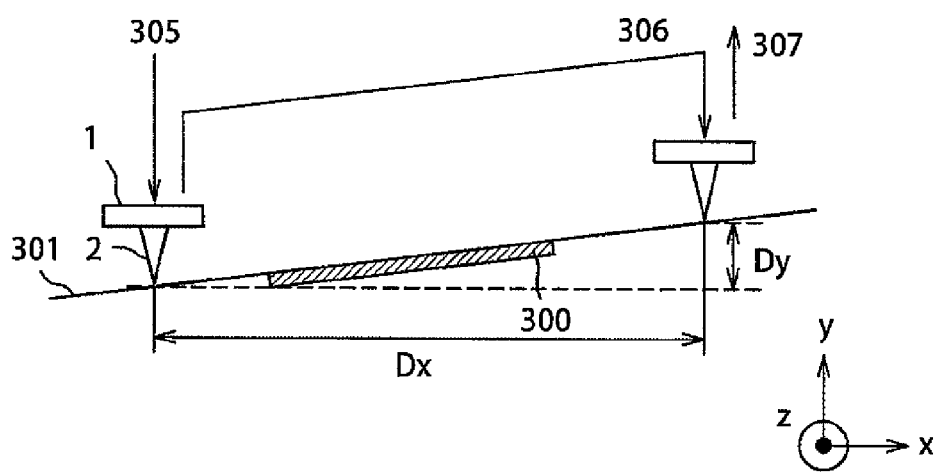

FIG. 7C shows a method of measuring the slant of the sample surface 300 using the probe 2. According to the method, the probe 2 approaches the sample surface 301 outside the observation region 300 to detect contact (contact (1)). The probe then retracts, travels distance Dx, reapproaches the sample surface 301 outside the observation region 300, and contacts the surface (contact (2)). Height displacement Dy of the sample surface 301 is orthogonal to the distance Dx between the contact (1) and the contact (2). An average slant estimated for the observation region 300 can be found as Dy/Dx.

The measurement technique in FIGS. 7A and FIG. 7B may radiate the measurement light to multiple points. The technique may improve the measurement accuracy by averaging results from the measurement points or using the other statistic. The technique may approximate results of measuring multiple points using a polynomial equation to correct the sample slant in consideration of irregularity on the sample surface 301.

Figure 8A:
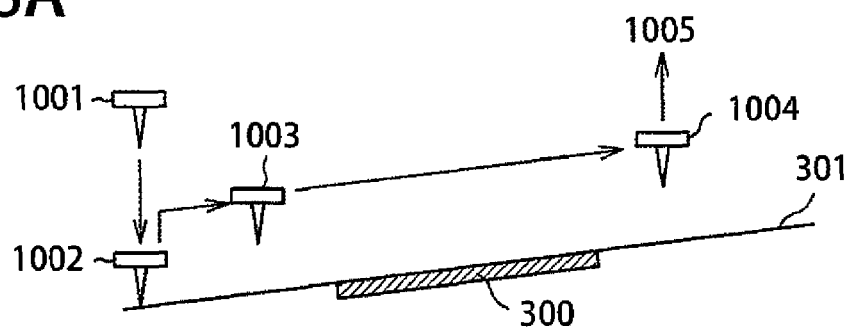
FIGS. 8A to 8D schematically show the scanning method of a probe according to the invention.
Figure 8B:
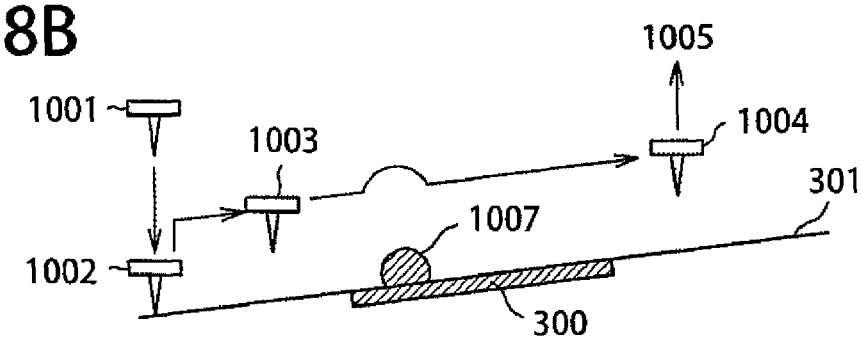

FIGS. 8A to 8D schematically show scanning methods for the probe 2. FIG. 8A shows a sequence along which the probe 2 approaches and scans the sample 5 when no foreign particle is found on the observation surface 300. FIG. 813 shows a method in which the probe 2 approaches and scans the sample 5 when a foreign particle is found on the observation surface 300.

The retracted probe 2 (1001) approaches the sample 5 when no foreign particle is found on the observation surface 300. The probe 2 contacts the sample surface outside the observation region 300 (1002). The probe 2 then moves away from the sample surface 301 for a specified quantity (determined by an operator). The probe 2 approaches the observation surface (1003), ends the observation (1004), and moves away from the sample (1005).

When the probe 2 approaches (1003) and observes (1004) the observation surface 300, the probe 2 is controlled to maintain a specified distance from the sample surface 301 during the scan using results of slant measurement for the sample surface 301 as described in FIG. 7, slant measurement using an optical interferometer, or slant measurement using the probe of a scanning probe microscope. A foreign particle 1007 may be detected on the sample surface 301 as a result of the optical observation (at least one of the bright-field and the dark-field observation) on the sample surface using the longitudinal observation system 18. In such case, it is preferable to provide control so that the probe 2 scans by avoiding the foreign particle 1007 based on position information and size information about the foreign particle 1007.

Figure 8C:
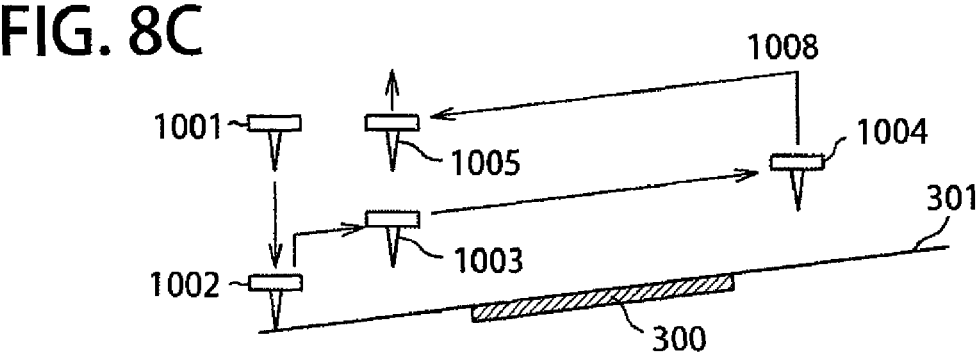

The technique shown in FIG. 8C performs two-dimensional scan 1004 by keeping the probe 2 away from the sample surface 301 for a specified distance. The technique then varies the distance between the probe 2 and the sample 5 and again measures (1008) the observation surface 300. The probe 2 may then move away from the sample 5.

The technique completes the measurement by varying the distance between the probe 2 and the sample 5 based on the one-time approach 1002 to the sample 5. The technique can save the time for the probe 2 to approach 1002 and acquire more pieces of magnetic field information in accordance with varied heights. After the measurement, the technique shown in FIG. 8D moves the probe 2 (1005) to the most interesting position (a region containing the most interesting object) instead of the position where the two-dimensional scan 1004 ends. The probe 2 may then move away from the sample 5. In this case, the probe 2 can continuously acquire information in the height direction while moving away from the sample 5. This makes it possible to increase information to be acquired.

Figure 9:
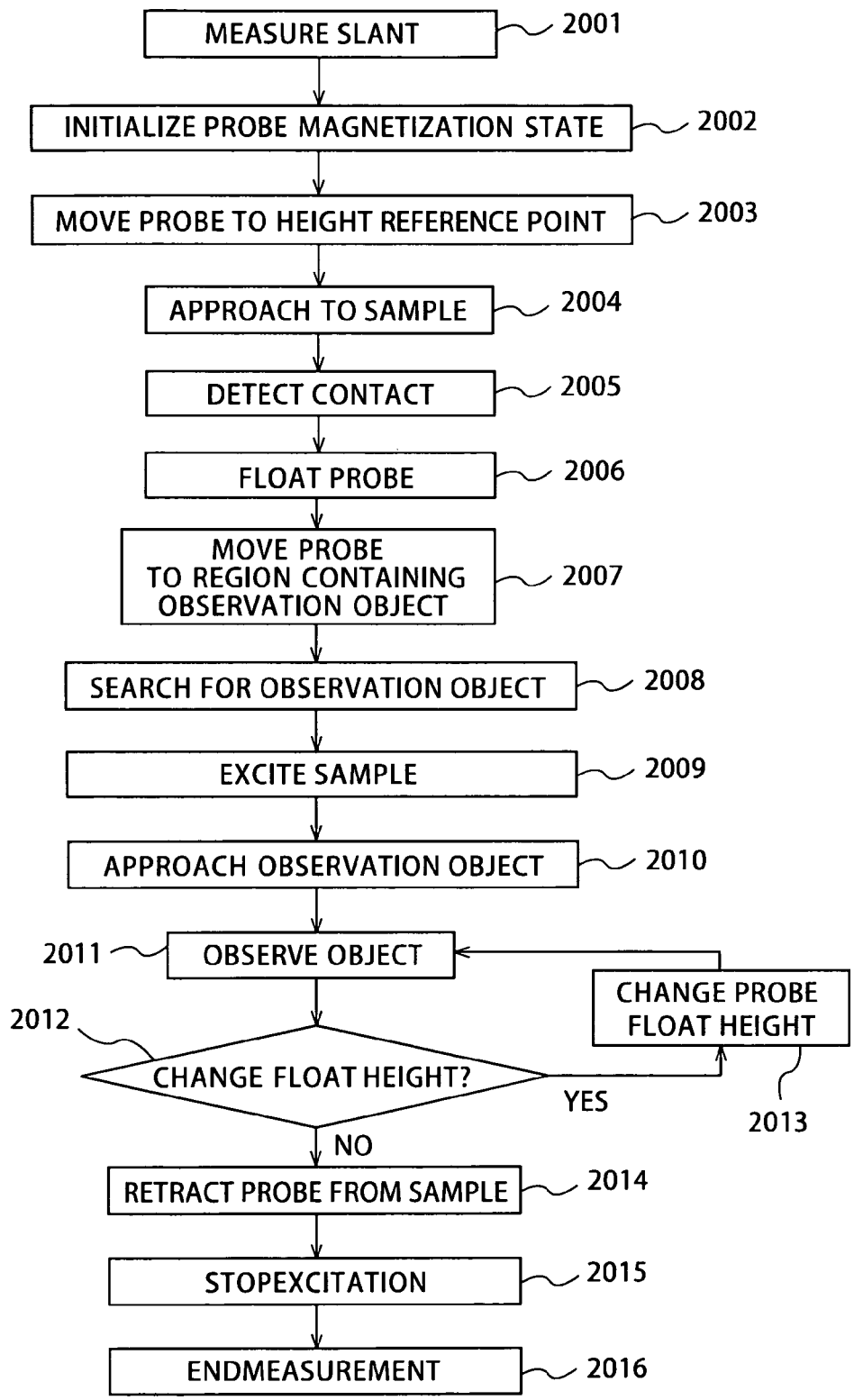
FIG. 9 shows a procedure of measuring sample according to the invention.

FIG. 9 shows an inspection sequence of the magnetic head inspection apparatus after the probe 2 moves to a region containing an observation object 300 of the sample 5. The apparatus first measures the surface tilt of a test object in accordance with the method shown in FIG. 7, for example, and stores the tilt information (2001).

The apparatus initializes the magnetization condition of the probe 2 (2002) using the means as shown in FIG. 4, for example. The apparatus moves the probe 2 to a height reference point for the sample (2003) and allows the probe 2 to approach the sample 5 (2004). An optical image acquired from the longitudinal observation system 18 may be used to find the position in the sample surface corresponding to the height reference point for the sample 5.

The probe 2 detects contact with the sample 5 (2005). The apparatus defines the contact point as the height reference point and moves the probe 2 away from the sample surface 301 for a specified distance (2006). For example, the position detector 6 as shown in FIG. 3 can detect the contact between the probe 2 and the sample 5 as a displacement at the tip of the cantilever 1, for example. The distance to the probe 2 at 2006 may be predetermined or may be directly entered by an operator.

The apparatus determines the height reference, moves the probe 2 away from the sample 5 for the specified distance, and then moves the probe 2 to a region that contains the observation object 300 (2007). At this time, the apparatus uses the previously measured sample slant information so as to prevent the probe 2 from contacting the sample surface 301 in the observation region 300. The apparatus moves the probe 2 to the region containing the observation object 300 (2008). The apparatus then excites the sample 2 using the constant current source 14 to generate a magnetic field and searches for the observation object 300 (2009).

During the search, the probe 2 two-dimensionally scans the observation object 300 to acquire an image. The two-dimensional scan is not limited to raster scan. The low resolution may be used as long as it can be used to search for the observation object 300. After the observation object 300 is found, the apparatus allows the probe 2 to approach the observation object 300 (2010). The probe 2 scans with accuracy enough for the necessary resolution. The position detector 6 measures vibration or displacement at the probe tip. A magnetic field generated from the sample is observed two-dimensionally (2011).

Figure 8D:
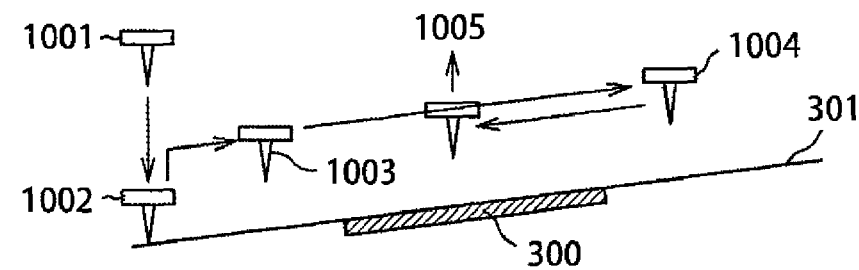

After completion of the two-dimensional observation, further measurement may be performed by varying the distance between the probe 2 and the sample 5 (YES at 2012). The apparatus then changes the probe float height (2013). The observation object 300 is observed again (2011). No measurement may be performed by varying the distance between the probe 2 and the sample 5 (NO at 2012). The apparatus then retracts the probe 2 from the sample (2014) and stops exciting the sample 5 (2015). As shown in FIG. 8D, the probe 2 may be retracted while making measurements above the interesting observation object 300. In this case, the apparatus stops exciting the sample 5 (2015) after the probe 2 indicates no response to the magnetic field generated from the sample 5. The apparatus ends the above-mentioned process of measuring one sample 5 (2016).

Figure 10:
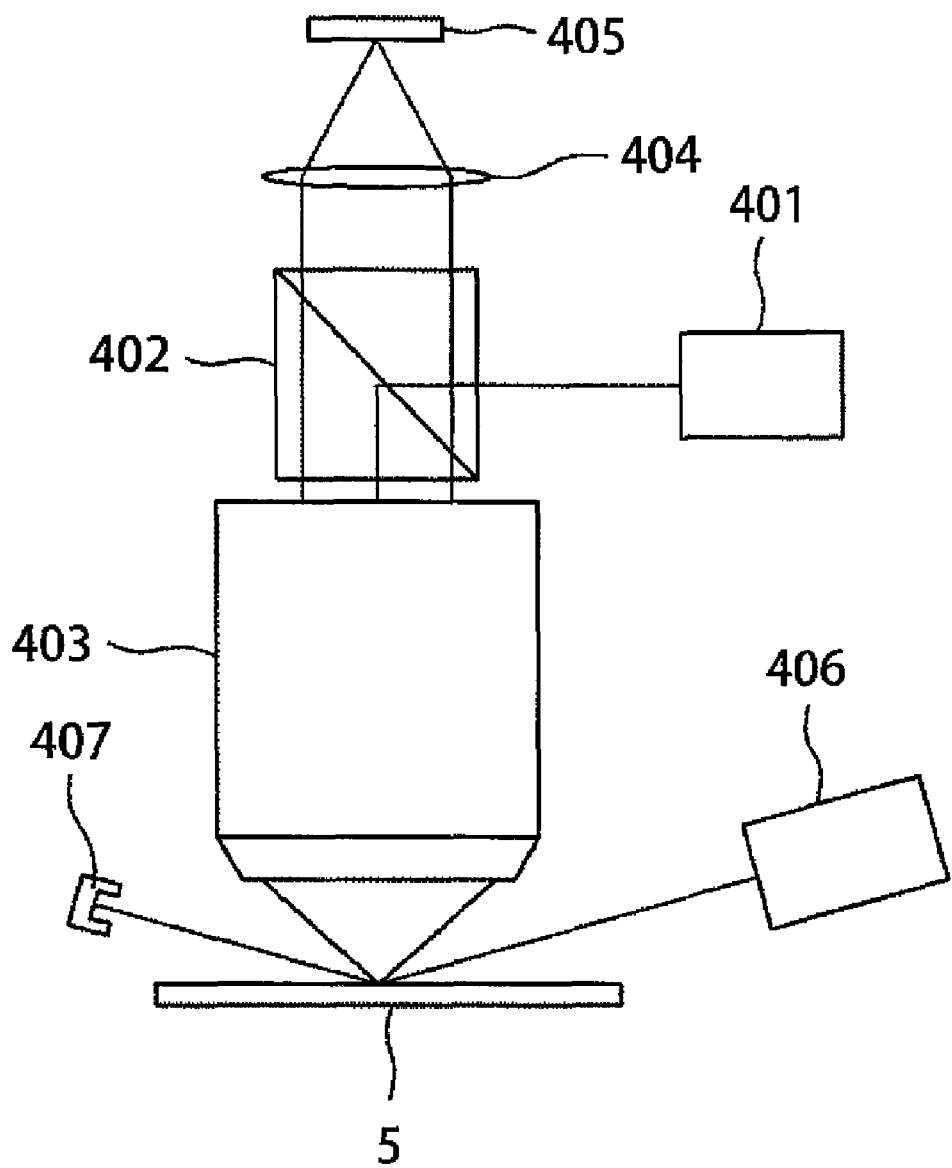
FIG. 10 exemplarily shows the configuration of an upstream observation system according to the invention.

FIG. 10 exemplarily shows the configuration of the longitudinal observation system 18 using a microscope. An illumination light source 401 generates illumination light. A beam splitter 402 reflects the light. An objective lens 403 collects the light on the surface of the sample 5. The objective lens 403 receives the illumination light reflected on the surface of the sample 5. The light passes through the beam splitter 402. An imaging lens 404 images the light on an imaging element 405.

The above-mentioned apparatus is used for bright-field measurement on the surface of the sample 5, the surface appearance inspection, and the observation position confirmation. A dark-field illumination 406 radiates illumination light. The light travels outside the objective lens 403 and is applied to the sample 5 from obliquely upward. The objective lens 403 receives the illumination light scattered by a fine foreign particle or defect, if any, on the surface of the sample 5. The imaging lens 404 collects the light on the imaging element 405. Such means enables dark-field observation on the sample surface. A beam stopper 407 blocks specular reflection light for the illumination light. The illumination light source 401 can use visible-light laser, ultraviolet laser, or white light.

Figure 11A:
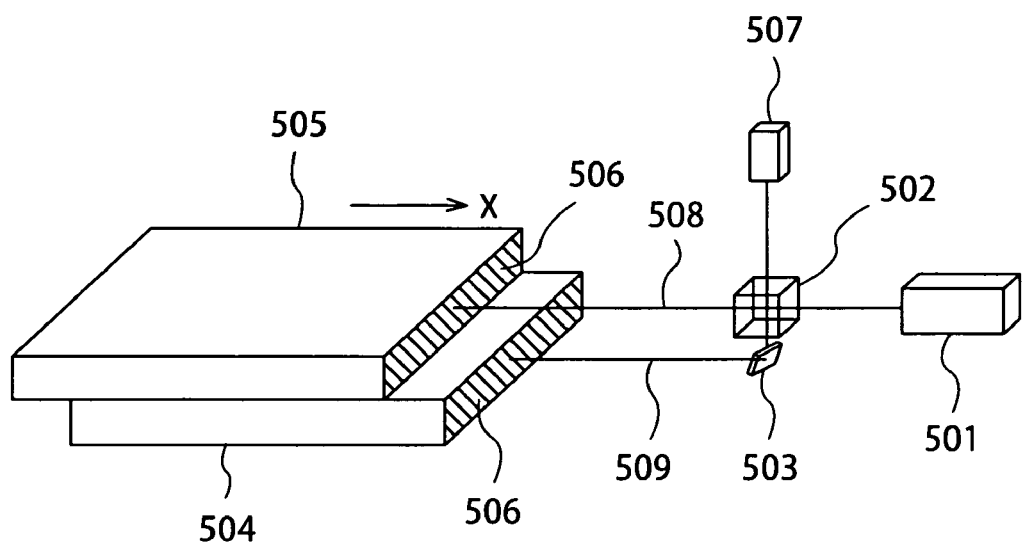
FIGS. 11A and 11B exemplarily show the configuration of a stage travel distance detection system according to the invention.

FIG. 11A exemplarily shows a mechanism that measures a travel distance of the fine XYZ scanner 8. A beam splitter 502 splits light radiated from a light source 501. One is used as measurement light 508. The other is used as reference light 509.

The light source 501 uses visible-light laser, for example. A mirror 503 guides the reference light 509 to a lower stage 504. The measurement light 508 is guided to an upper stage 505. A mirror 506 is provided for one side of the upper stage 505 where the measurement light 508 is radiated. The mirror 506 is also provided for at least part of the lower stage 504 where the reference light 509 is radiated. The mirror 506 reflects the measurement light 508 and the reference light 509.

Figure 11B:
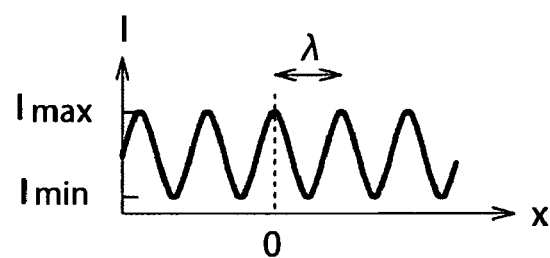

The upper stage 505 reflects the measurement light 508. The lower stage 504 reflects the reference light 509. The beam splitter 502 synthesizes the measurement light 508 and the reference light 509 along the same axis and guides both to a light detector 507. The light detector 507 uses a photodiode, CCD array, or line sensor, for example. The measurement light 508 and the reference light 509 interfere with each other on a detection surface of the light detector 507. The light intensity or an interference pattern measured by the light detector 507 varies as the upper stage 505 moves. FIG. 11B schematically shows how the light intensity changes at a given point on the light detector 507 as the upper stage 505 moves. The horizontal axis represents the travel distance of the upper stage 505.

The light intensity at a given point on the light detector 507 varies sinusoidally with the movement of the upper stage 505. Monitoring the light intensity makes it possible to detect the travel distance of the upper stage 505. For example, it is possible to detect that the upper stage 505 moves in the x direction as long as wavelength A of the light radiated from the light source 501 at one cycle of light intensity variation from Imax, Imin, and then back to Imax.

It may be preferable to detect not only the maximum value Imax and minimum value Imin in light intensity variations but also the light intensity between Imax and Imin in more detail. This makes it possible to monitor the travel distance of the upper stage 505 with resolution shorter than the wavelength A. Interference pattern movement can be monitored when the light detector 507 uses a two-dimensional imaging element such as a two-dimensional CCD array. It is also possible to measure pitching and yawing as well as the x-direction travel distance of the upper stage 505.

Second Embodiment

An exciting current to be applied to the sample 5 has frequency fE. When the cantilever 1 is vibrated, the frequency fE is N times or one N-th the resonance frequency f of the cantilever 1. The vibration amplitude of the cantilever 1 may become equal to or smaller than a noise level. In such case, the frequency fE of the exciting current applied to the sample 5 needs to be changed so that the vibration amplitude of the cantilever 1 may become equal to or greater than the noise level.

Figure 16A:
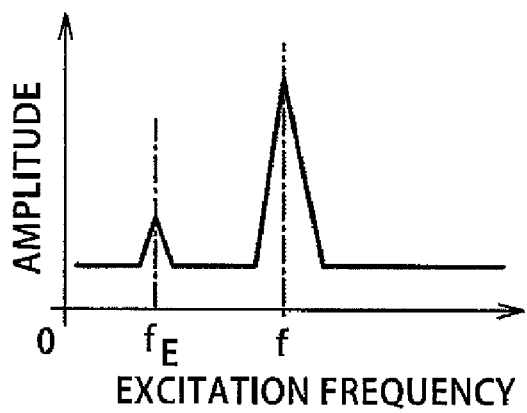
FIGS. 16A to 16D show relation between a sample exciting current frequency and a cantilever resonance frequency according to the invention.
Figure 16B:
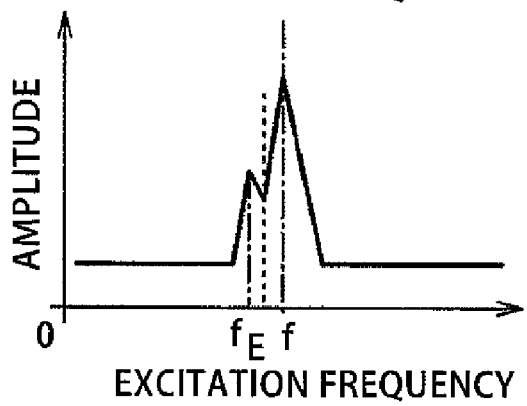
Figure 16C:
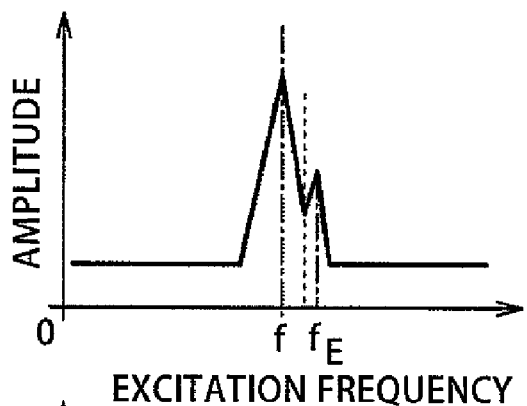
Figure 16D:
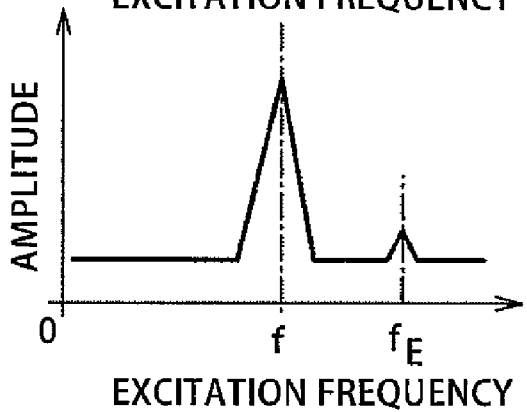

FIGS. 16A to 16D exemplarily show relation between the resonance frequency f and the exciting current frequency $f_E$ when the exciting current frequency $f_E$ is changed from N times or one N-th the resonance frequency f of the cantilever 1. FIG. 16A shows relation $f_E$<f. FIG. 16B shows relation $f_E$<f while both approximate to each other. FIG. 16C shows relation $f_E$>f while both approximate to each other. FIG. 16D shows relation $f_E$>f.

As seen from the examples in FIGS. 16A through 16D, any value can be selected for the exciting current frequency $f_E$ independently of the resonance frequency f. According to the examples in FIGS. 16A and 16D, the exciting current frequency $f_E$ and the resonance frequency f are separated from each other. It is in order to easily separate components of the resonance frequency f and the exciting current frequency $f_E$ from each other and shorten a time constant td for the forced cantilever vibration at the exciting current frequency $f_E$. According to the examples in FIGS. 16B and 16C, the exciting current frequency $f_E$ and the resonance frequency f approximate to each other. It is in order to ensure large amplitude even though the time constant td for the forced cantilever vibration becomes long.

FIGS. 17A to 17E exemplarily show frequency filters used for separating components of the resonance frequency f and the exciting current frequency $f_E$ from each other and improving the signal-to-noise ratio in accordance with the relations between the exciting current frequency $f_E$ and the resonance frequency f shown in FIGS. 16A to 16D. In the following description, a cutoff frequency is assumed to change from the pass band to the stop band in a frequency filter.

Figure 17A:
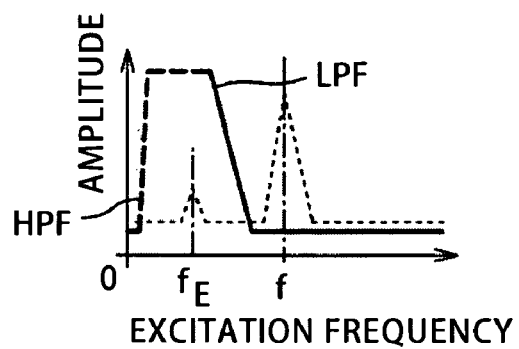
FIGS. 17A to 17E schematically show a frequency filter used for a displacement signal that is applied to the cantilever tip and is measured by the position detection apparatus according to the invention.

FIG. 17A shows a frequency filter used for excitation at a frequency lower than the resonance frequency f ($f_E$<f such as the example in FIG. 16A or 16B). The condition $f_E$<f removes resonance frequency components. In this case, a low pass filter (LPF) is used so that a cutoff frequency fC is lower than the resonance frequency and is higher than the exciting current frequency ($f_E$<fC<f). A frequency component lower than the exciting current frequency $f_E$ needs to be removed when a low-frequency oscillation or a background remains. In this case, a high pass filter (HPF) is used so that the cutoff frequency fC is lower than the exciting current frequency $f_E$ (fC<$f_E$).

Figure 17B:
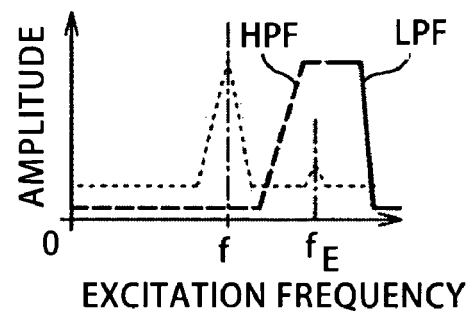

FIG. 17B shows a frequency filter used for excitation at a frequency higher than the resonance frequency f ($f_E$>f such as the example in FIG. 16C or 16D). The condition $f_E$>f removes resonance frequency components. In this case, a high pass filter is used so that a cutoff frequency fC is higher than the resonance frequency and is lower than the exciting current frequency (f<fC<$f_E$). A frequency component higher than the exciting current frequency $f_E$, needs to be removed when a high-frequency noise degrades the signal-to-noise ratio. In this case, a low pass filter is used so that the cutoff frequency fC is higher than the exciting current frequency $f_E$ ($f_E$<fC).

Figure 17C:
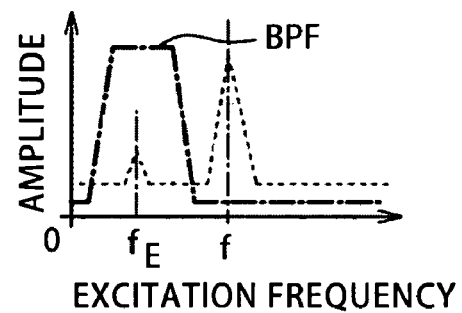

FIG. 17C shows a frequency filter used for excitation at a frequency lower than the resonance frequency f ($f_E$<f such as the example in FIG. 16A or 16B). The condition $f_E$<f acquires only frequency components in a band containing the exciting current frequency $f_E$. In this case, a band pass (BPF) filter is used so that low-frequency cutoff frequency fCBL is lower than the resonance frequency f (fCBL<$f_E$) and high-frequency cutoff frequency fCBH is higher than the exciting current frequency $f_E$ and is lower than the resonance frequency ($f_E$<fCBH<f).

Figure 17D:
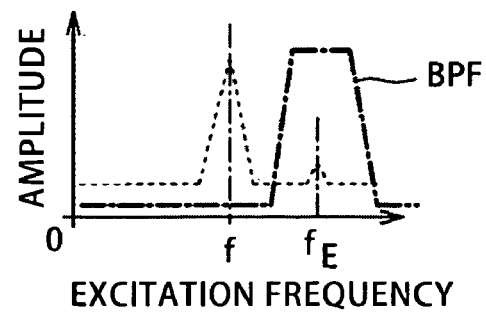
Figure 17E:
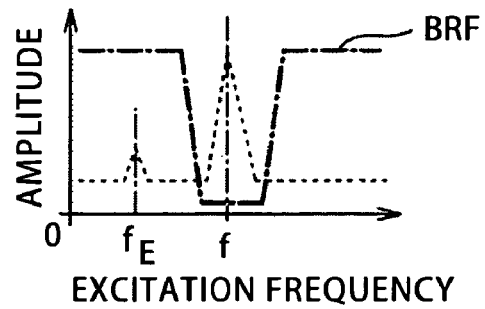

FIG. 17D shows a frequency filter used for excitation at a frequency higher than the exciting current frequency f (f<$f_E$ such as the example in FIG. 16C or 16D). The condition f<$f_E$ acquires only frequency components in a band containing the exciting current frequency $f_E$. In this case, a band pass filter is used so that low-frequency cutoff frequency fCBL is higher than the resonance frequency f and is lower than the exciting current frequency (f<fCBL<$f_E$) and high-frequency cutoff frequency fCBH is higher than the exciting current frequency $f_E$ ($f_E$<fCBH). FIG. 17E shows a band rejection filter (BRF) that removes components of the resonance frequency f.

At least one of the frequency filters shown in FIGS. 17A through 17E is used for signal processing so as to remove components of the resonance frequency f, low-frequency oscillation, background, and high-frequency noise and acquire a signal containing components of the exciting current frequency $f_E$ at good signal-to-noise ratio. The frequency filters in FIGS. 17A and 17C actually work the same but differ in the ease of filter fabrication. The frequency filters in FIGS. 17B and 17D actually work the same but differ in the ease of filter fabrication.

There have been described the examples in FIGS. 16A and 16D. The examples in FIGS. 16B and 16C show proximity between the exciting current frequency $f_E$ and the resonance frequency f of the cantilever 1. The method with reference to FIG. 17 is also applicable to this case using a filter that can sharply separate the frequencies at a dotted line in FIG. 16B or 16C.

Fast measurement results from a small time constant td in the time waveform for the components of the exciting current frequency fE extracted by the frequency filter. The frequency filters shown in FIGS. 17A through 17E are designed to shorten the time constant td after completion of the forced vibration. Selection of the exciting current frequency $f_E$ described with reference to FIG. 16 and use of the frequency filters described with reference to FIG. 17 make it possible to provide the cantilever 1 with the time constant for vibration smaller than that for resonance and ensure the vibration amplitude larger than a noise level.

Figure 18A:
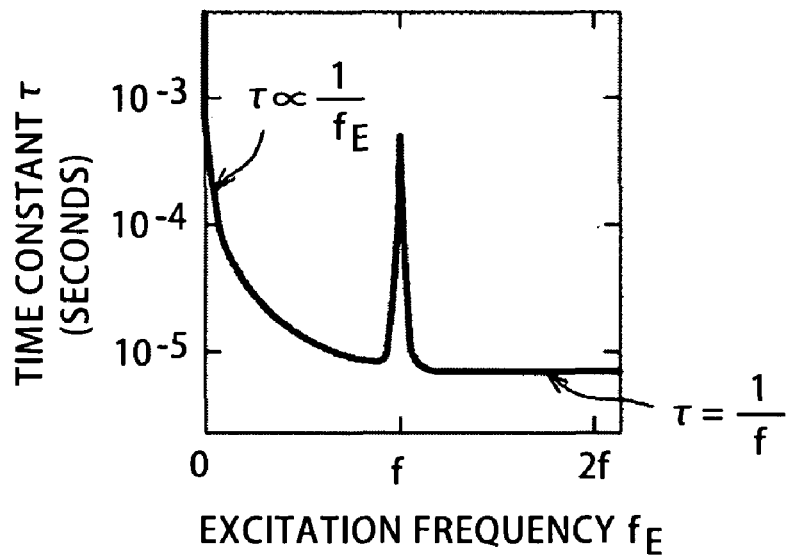
FIGS. 18A and 18B show mechanical characteristics of cantilever vibration according to the invention.
Figure 18B:
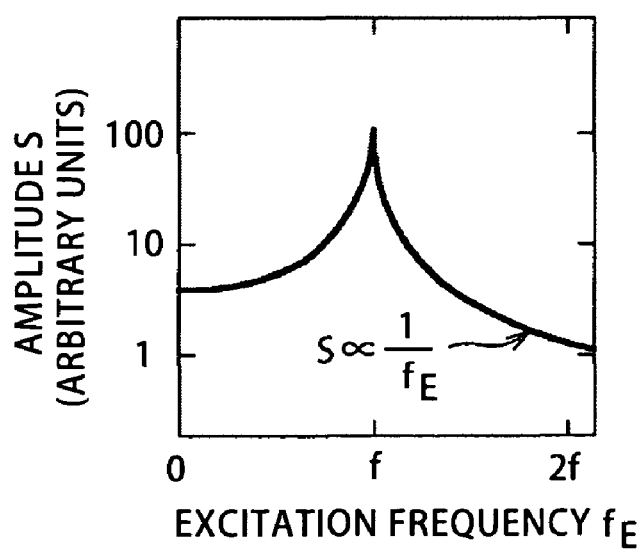

FIG. 18A shows relation between the theoretically generated exciting current frequency $f_E$ and time constant td for the forced cantilever vibration to be excited. FIG. 18B shows relation between the theoretically generated exciting current frequency $f_E$ and amplitude S for the forced cantilever vibration to be excited. As seen from the relation in FIG. 18A, increasing the exciting current frequency $f_E$ decreases the time constant td in reverse proportion to the exciting current frequency $f_E$ when the exciting current frequency $f_E$ is equal to or lower than the resonance frequency f. Increasing the exciting current frequency $f_E$ always keeps the time constant td remaining 1/f when the exciting current frequency $f_E$ is equal to or higher than the resonance frequency f. The time constant td physically decreases as the frequency increases. The time constant td remains 1/f at the resonance frequency or higher because the lock-in detection consumes the time 1/f.

As seen from FIG. 18B, increasing the exciting current frequency $f_E$ increases the forced cantilever vibration amplitude S when the exciting current frequency $f_E$ is equal to or lower than the resonance frequency f. Increasing the exciting current frequency $f_E$ exponentially attenuates the forced cantilever vibration amplitude S when the exciting current frequency $f_E$ is equal to or higher than the resonance frequency f. The exciting current frequency $f_E$ is determined in consideration of necessary time constant td and amplitude S according to FIGS. 18A and 18B. For example, let us suppose that the forced cantilever vibration amplitude S corresponds to a frequency higher than the resonance frequency f but can be ensured to be sufficiently larger than the noise level. In such case, the exciting current frequency $f_E$ is configured to be equal to or higher than the resonance frequency f so as to minimize the time constant td.

There may be a case where the forced cantilever vibration amplitude S becomes smaller than the noise level at a frequency higher than the resonance frequency f. There may be a need for increasing the forced cantilever vibration amplitude S and improving the measurement accuracy. To increase the forced cantilever vibration amplitude S, the exciting current frequency $f_E$ is configured to be approximately higher than the resonance frequency f or lower than the resonance frequency f. When the frequency filters in FIGS. 17A to 17E are used for signal processing, it is also desirable to separate the resonance frequency f and the exciting current frequency $f_E$ from each other so that the time constant td can be shortened and frequency filters can be designed easily.

Figure 19:
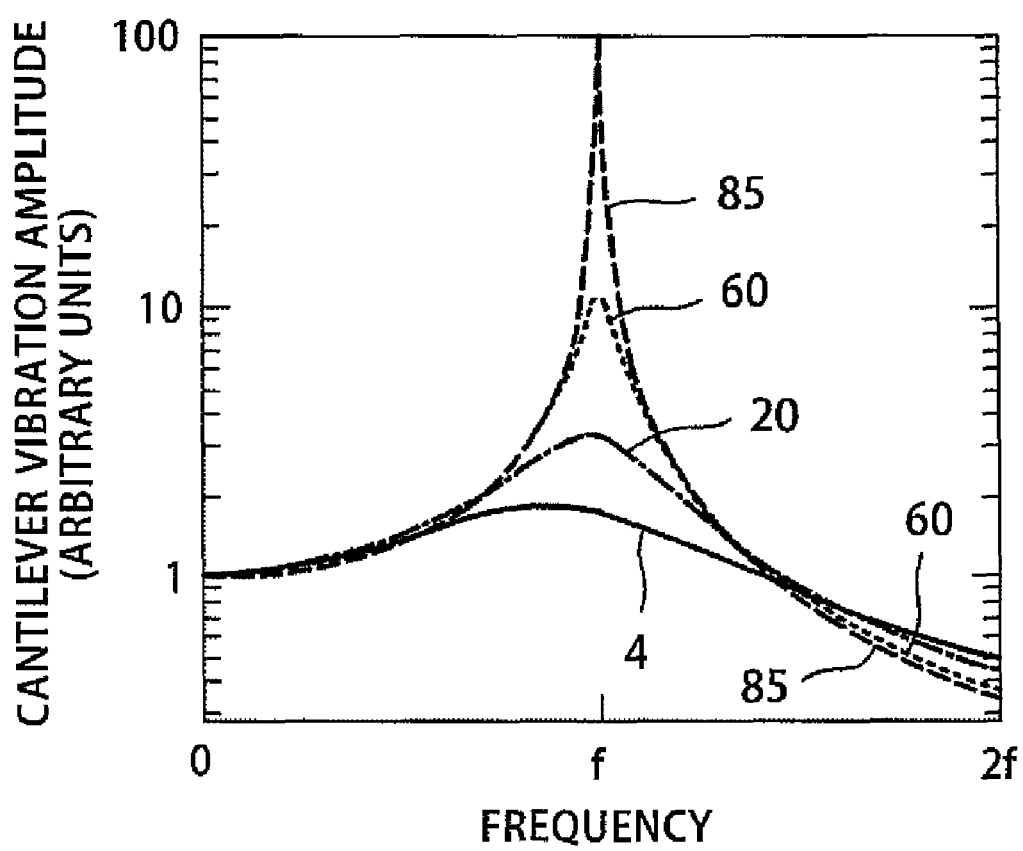
FIG. 19 shows Q value dependence of the vibration amplitude generated from the cantilever according to the invention.

FIG. 18B shows the relation between the exciting current frequency $f_E$ and the forced cantilever vibration amplitude S for the cantilever having a given Q value. The relation varies with the Q value. FIG. 19 exemplarily shows relation between the exciting current frequency $f_E$ and the forced cantilever vibration amplitude S dependent on the Q value of the cantilever. Specifically, FIG. 19 shows the relation between the exciting current frequency $f_E$ and the forced cantilever vibration amplitude S when the Q value is decreased from Q=85 provided for the cantilever to Q=4.

Components of the resonance frequency f reduce as the Q value decreases. Decreasing the Q value increases the amplitude of the cantilever 1 at an exciting current frequency 1.5 times higher than the resonance frequency f. At a frequency approximately twice the resonance frequency, the amplitude of the cantilever 1 for Q value 20 approximately doubles that for Q value 85. At a frequency approximately twice the resonance frequency, the amplitude of the cantilever 1 for Q value 4 further increases. Based on the data in FIG. 19, the Q value equal to or smaller than 20 is especially advantageous to measurement at high frequencies. When the cantilever is forcibly vibrated at a frequency higher than the resonance frequency, decreasing the Q value can improve the signal-to-noise ratio. When an alternating current excites the sample 5 to vibrate the cantilever 1, decreasing the Q value for the cantilever 1 can decrease the time constant for the vibration of the cantilever 1.

The Q value for the cantilever 1 can be decreased by one of or a combination of two or more of: means for applying or attaching, to the cantilever 1, a material with different elasticity from a material of the cantilever 1; means for bonding an piezoelectric element to the cantilever 1; means for varying the thickness or width of the cantilever 1 in the length direction of the cantilever 1; and means for layering materials with different elastic constants to configure the cantilever 1. The mechanical vibration characteristics of the cantilever 1 shown in FIGS. 18A and 18B can be used to determine the frequency of a current applied to the sample 5 so as to be capable of acquiring the necessary time constant and vibration amplitude.

Figure 20A:
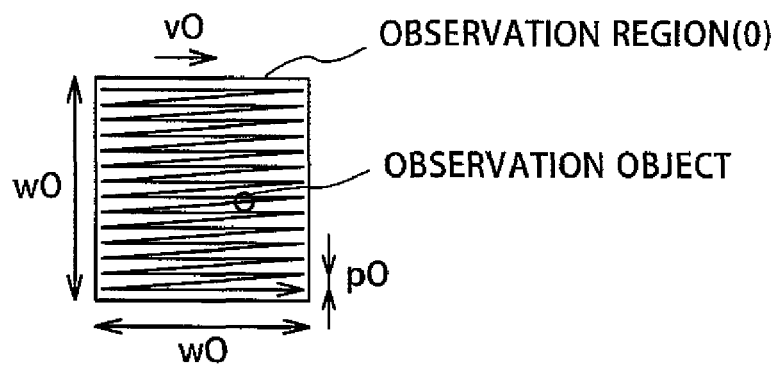
FIGS. 20A to 20E schematically show a probe scanning technique for two-dimensional observation according to the invention.

FIG. 20A exemplarily shows a basic scan method of allowing the probe 2 to scan two-dimensionally and acquiring two dimensional distribution of a magnetic field.

The two-dimensional scan method shown in FIG. 20A allows the probe 2 to raster scan a predetermined region at pitch p0 and velocity v0. In this case, the measurement consumes time $(w0)^2/(p0 \times v0)$.

There is available a variable scan method that divides the scan into two steps to shorten the measurement time. Of the two steps of the variable scan method, the first half performs coarse scan to search for a targeted measurement object. The latter half performs fine scan that measures only near the measurement object with necessary accuracy. The variable scan method will be described with reference to FIGS. 20B through 20E.

Figure 20B:
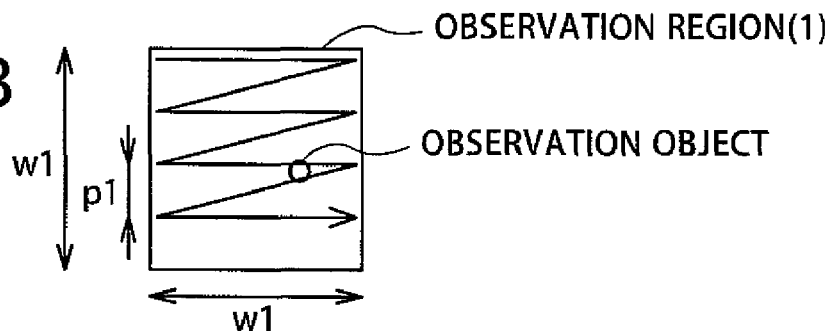

FIG. 20B shows an example of the coarse scan technique performed for the first half of the variable scan method. According to the example, the coarse scan searches for a specifically targeted observation object at pitch p1 and velocity v1 in a predetermined region w1×w1. The fine scan 2 in FIG. 20C then measures range w1×w2 including the observation object at pitch p2 and velocity v2 according to predetermined measurement mode.

Figure 20C:
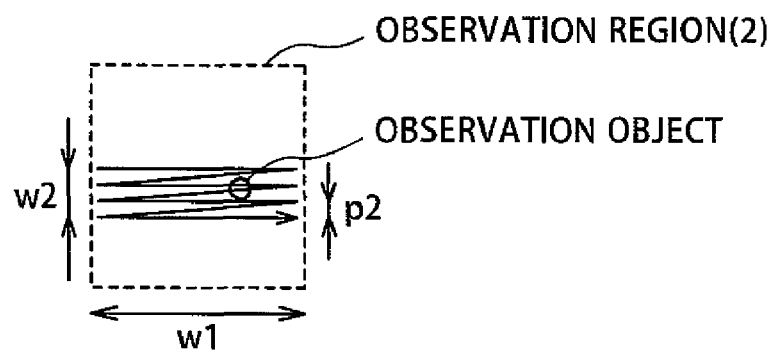

A two-dimensional observation technique according to a combination of FIGS. 20B and 20C can shorten the measurement time for the targeted observation object to $(w1)^2/(p1 \times v1)+(W2 \times w1)/(p2 \times v2)$ compared to the scan method shown in FIG. 20A. A technique in FIG. 20D performs the coarse scan 1 in FIG. 20B to detect a targeted observation object. The technique then measures region w2×w2 including the observation object at pitch p2 and velocity v2 according to predetermined measurement mode.

Figure 20D:
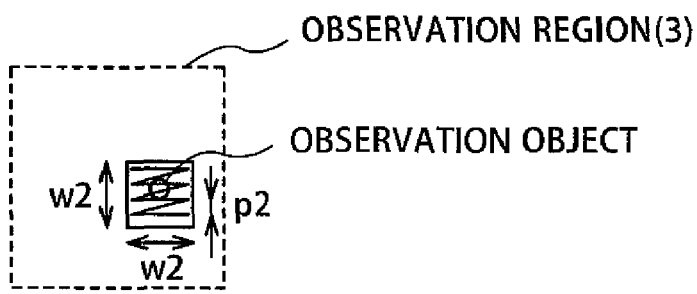

A measurement method according to a combination of FIGS. 20B and 20D can narrow the measurement range w2/w1 of the measurement method shown in FIG. 20C. The measurement time can be shortened to $(w1)^2/(p1 \times v1) (w2)^2/(p2 \times v2)$. A technique in FIG. 20E performs the coarse scan 1 shown in FIG. 20B to detect a targeted observation object. The technique then measures only targeted measurable physical quantity (e.g., width or height) about the targeted observation object in a predetermined width w3 at velocity v3 according to predetermined measurement mode.

Figure 20E:
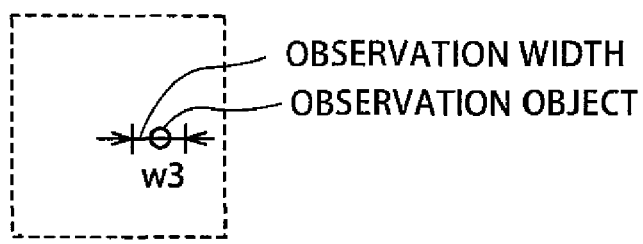

A measurement method according to a combination of FIGS. 20B and 20E can decrease the number of scan lines p2/w2 of the measurement method shown in FIG. 20D. The measurement time can be shortened to $(w1)^2/(p1 \times v1)+(w3/v3)$. The scan methods in FIGS. 20C, 20D, and 20E perform measurement more than once using the same mode and the same setting. Averaging the results can improve the signal-to-noise ratio. The scan methods in FIGS. 20A to 20E for the probe 2 can shorten the measurement time.

An actual measurement means will be described. The measurement means searches for a targeted point of the sample 5 in accordance with magnetic force microscope measurement that keeps the sample 5 and the probe 2 contactless. When measuring the feature quantity as a surface shape, the means searches for the measurement point and then performs atomic force microscope measurement. When measuring the feature quantity as magnetic field information, the means performs magnetic force microscope measurement. The measurement means is especially effective when: the targeted point of the sample 5 generates a magnetic field; the sample 5 can be excited from outside; or the surface of the sample 5 contains no characteristic shape and makes it difficult to search for a measurement point based on shapes.

The above-mentioned measurement means contactlessly searches for a targeted point. The probe 2 can be protected against wear. The cantilever 1 or the probe 2 can be replaced less frequently. The measurement means is also effective for reducing running cost of the apparatus. Since the probe 2 is subject to little wear, the measurement means can restrain reproducibility degradation due to the probe 2. The measurement reliability can be improved. The sample 5 can be protected against damage because the magnetic force microscope measurement keeps the probe 2 and the sample 5 contactless.

Figure 21:
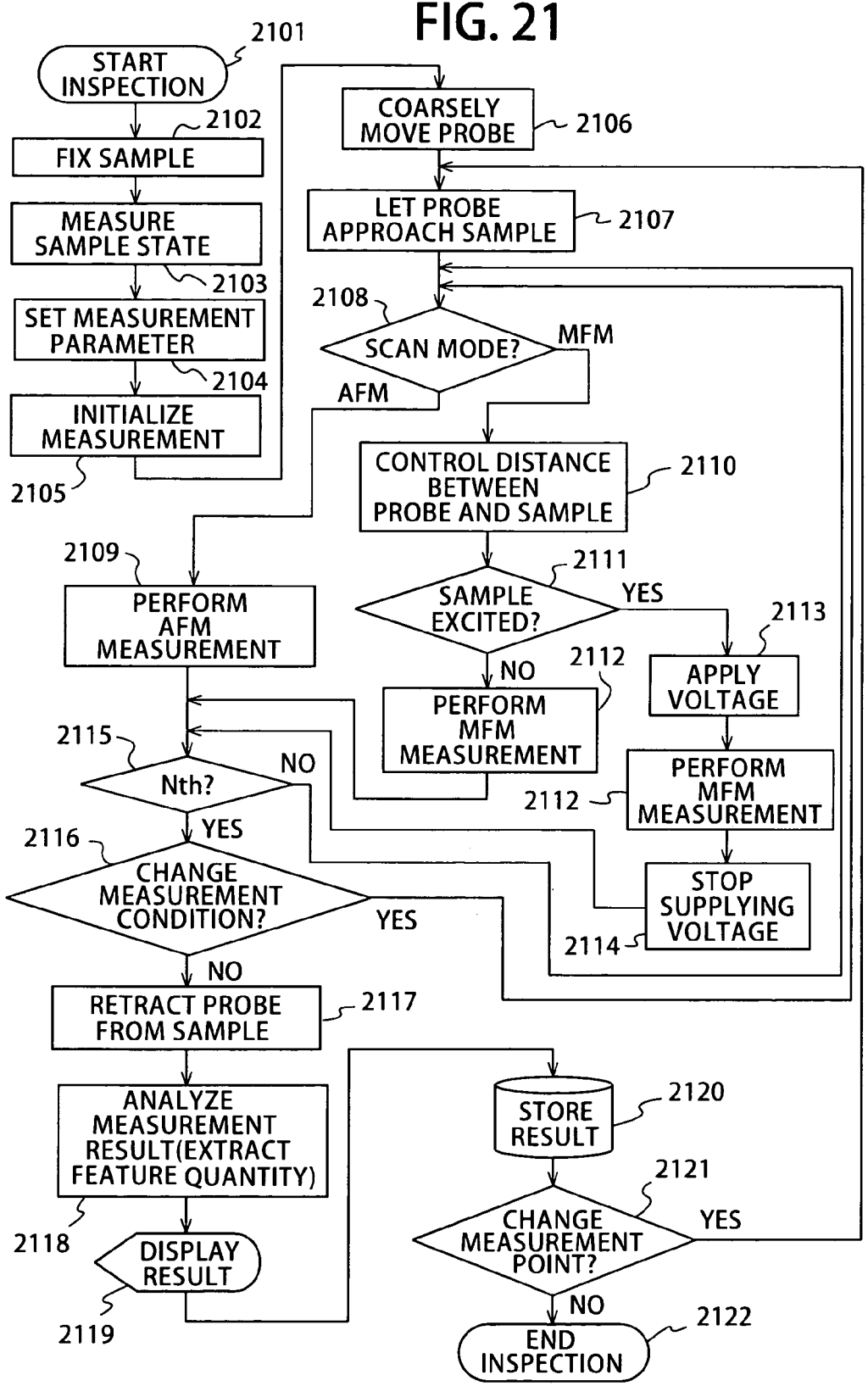
FIG. 21 shows an inspection procedure according to the invention.

FIG. 21 exemplarily shows a magnetic device inspection sequence. The inspection starts with fixing the sample 5 to the fine XYZ scanner 8 (2102). The sample 5 may be fixed by suction, an adhesive material, or a mechanical clamp.

Figure 24:
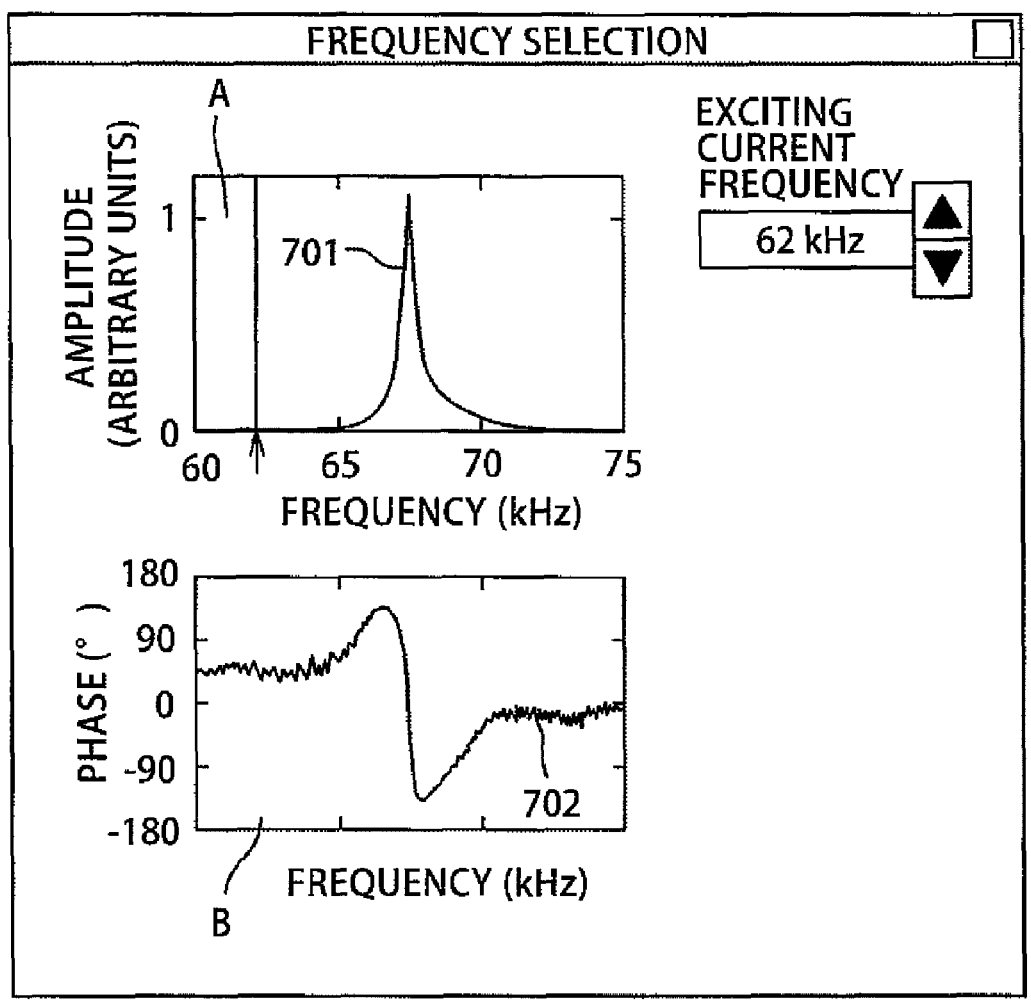
FIG. 24 exemplarily shows a GUI for configuring an exciting current frequency according to the invention.
Figure 25:
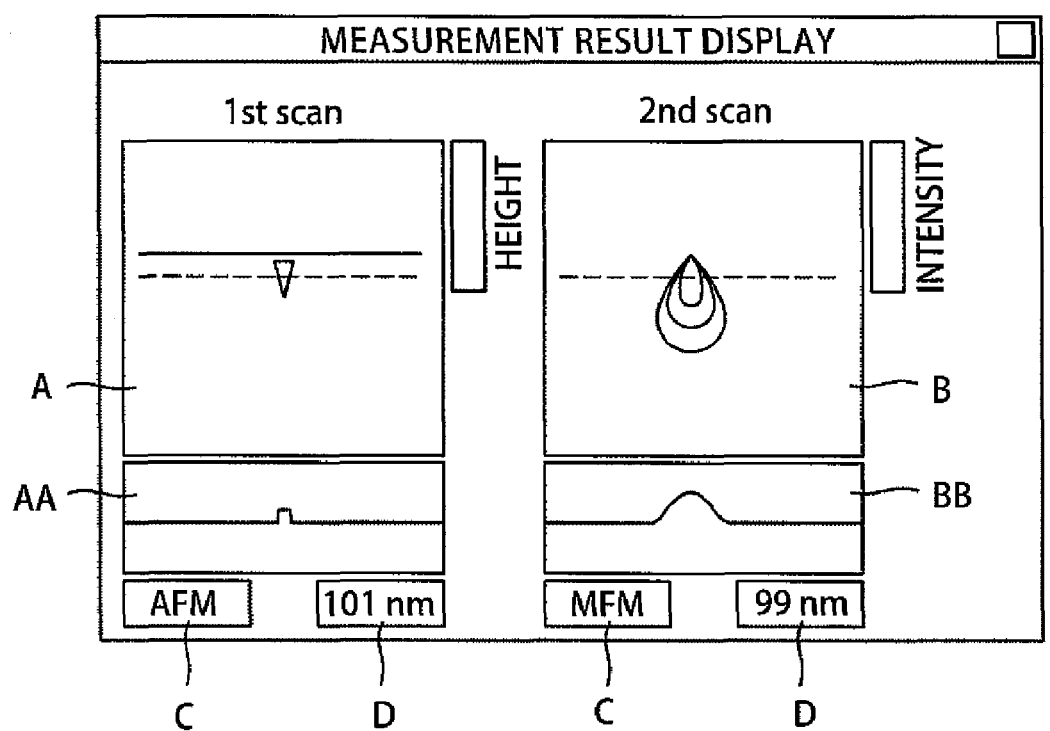
FIG. 25 exemplarily shows a GUI for two-dimensionally displaying a measurement result according to the invention.

The measurement sequence measures the fixed state of the sample 5 (2103). The measurement uses an optical device such as a camera or a microscope, for example. The measurement sequence measures information about the sample 5 such as a position, slant, or shape of the sample 5, for example. The measurement sequence configures measurement parameters (2104). FIGS. 24, 25, and 26 exemplarily show parameters to be configured and GUI for configuration operations.

The measurement sequence then initializes a measurement system (2105). The initialization includes a calibration process using a known magnetic field that always ensures constant intensity and spatial spread. The calibration process is performed so that the probe 2 provided with the magnetic material as shown in FIG. 2 is constantly sensitive to a magnetic field generated from the sample. The measurement sequence allows the probe 2 to coarsely approach the sample 5 (2106). The coarse approach at 2106 is based on the position and the tilt of the sample 5 as results of the sample state measurement at 2103. The measurement sequence allows the probe 2 to further approach and contact the sample 5 (2107). The approach at 2107 is controlled with regard to an approach speed or a contact force between the probe 2 and the sample 5 based on predetermined parameters or parameters enables by the measurement parameter configuration at 2104.

After the probe 2 contacts the sample 5, the measurement sequence selects measurement mode in accordance with the measurement parameter configuration at 2104 (2108). When AFM observation is selected for the surface of the sample 5 (AFM at 2108), the measurement sequence performs AFM measurement (2109). When MFM measurement is selected (MFM at 2108), the measurement sequence controls a distance between the probe 2 and the sample 5 (2110). The measurement sequence determines whether or not to excite the sample 5 during the MFM measurement (2111). When the sample 5 is not excited (NO at 2111), the measurement sequence performs the MFM measurement (2112).

When the sample 5 is excited (YES at 2111), the measurement sequence applies a voltage to the sample 5 (2113) and performs the MFM measurement (2112). After the measurement, the measurement sequence stops applying the voltage to the sample 5 (2114). After the measurement (2109 or 2112), the measurement sequence determines whether or not the measurement is performed for a predetermined count or a count specified by the measurement parameter configuration at 2104 (2115). When the measurement needs to be continued (NO at 2115), the measurement sequence returns to 2108 and continues the measurement.

When the measurement need not be continued (YES at 2115), the measurement sequence determines whether or not the measurement condition is changed to continue the measurement (2116). When the condition is changed to continue the measurement (YES at 2116), the measurement sequence changes the measurement condition in accordance with a predetermined condition change or a condition change specified at 2104 and returns to 2107 for measurement. When the condition is not changed (NO at 2116), the measurement sequence moves the probe 2 away from the sample 5 (2117). The measurement sequence then analyzes the result of the measurement at 2109 or 2112 in accordance with predetermined parameters or those configured at 2104 (2118). Measurement and analysis results are displayed in accordance with GUI as shown in FIGS. 25 and 26 (2119) and are stored in a recording apparatus along with the condition such as measurement parameters configured at 2104 (2120). When the sample is replaced or the same sample is measured at another point (YES at 2121), the measurement sequence changes the relative position between the probe 2 and the sample 5 and resumes the measurement from 2107. When all measurement objects are measured, for example, the measurement sequence terminates (NO at 2121). The measurement parameter configuration 2104 may be performed before or simultaneously with the sample fixing 2102 or the sample state measurement 2103. Alternatively, predetermined parameters may be used depending on a sample to be used.

FIG. 22 exemplarily shows a GUI used for the measurement parameter configuration 2102 in FIG. 21 showing the measurement sequence. FIG. 22 shows an example of performing the measurement twice, AFM and MFM. Parameters specified for each measurement include, for example, measurement mode, measurement range, measurement density, measurement speed, distance between the probe 2 and the sample 5, exciting current frequency for the sample 5, exciting current for the sample 5, waveform which excites the sample 5 magnetically, set point for determining a contact force between the cantilever 1 and the sample 5, and scan direction of the probe 2 for two-dimensional scan.

The input parameters shown in FIG. 22 may or may not be specified depending on the selected measurement mode. FIG. 23 exemplarily shows a GUI that specifies parameters for a frequency filter used for the measurement. FIG. 23 shows an example of MFM measurement. The parameters include types of frequency filters used for the measurement, cutoff frequency, pass band decay rate, and stop band decay rate. The parameters in FIG. 23 may or may not be specified depending on the type of frequency filter to be selected.

FIG. 24 exemplarily shows a GUI for selecting the exciting current frequency $f_E$. FIG. 24A shows frequency dependence 701 of the vibration amplitude measured on the cantilever 1 excited by the vibration element 3. A frequency is selected on the graph in FIG. 24A or a numeric value is entered to determine the exciting current frequency $f_E$. There may be provided a function that displays the determined exciting current frequency $f_E$ on the graph in FIG. 24A. As shown in FIG. 24B, there may be provided a function that displays phase information 702 about the vibration of the cantilever 1 acquired simultaneously with the information in FIG. 24A.

FIG. 25 exemplarily shows a GUI that displays a result of the measurement 2109 or 2112. FIG. 25A shows an example of displaying an irregular AFM image acquired at the AFM measurement (2109) of the sequence in FIG. 21. FIG. 25A illustrates observation of a triangle fine object as a plan view. FIG. 25AA represents a cross-sectional shape of the fine object acquired by scanning along the broken line in FIG. 25A.

FIG. 25B shows an example of displaying an MFM image acquired at the MFM measurement (2112) of the sequence in FIG. 21. FIG. 25B represents contours of a magnetic field generated from the magnetic device. FIG. 25BB represents distribution of the magnetic field acquired by scanning the magnetic field contours in FIG. 25B along the broken line.

The GUI in FIG. 25 may include the function of displaying two-dimensional measurement results but also a section to display the measurement mode (FIG. 25C) and a section to numerically display a width corresponding to a threshold value specified for a given position (FIG. 25O). The GUI may further include: a function that searches the measurement result for a specifically targeted measurement object; a function that extracts a targeted feature quantity from the targeted measurement object; and a function that display the results.

FIG. 26 exemplarily shows a GUI that displays a result of the measurement 2109 or 2112. The example GUI in FIG. 26 includes display columns. A column 703 displays a measurement number. A column 704 displays an object width extracted from an AFM measurement result, for example. A column 705 displays a magnetic field spread width extracted from an MFM measurement result.

Figure 27A:
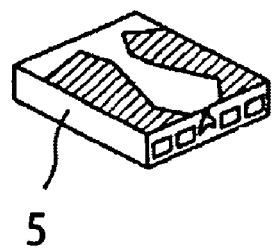
FIGS. 27A and 27B exemplarily show a sample configuration according to the invention.
Figure 27B:
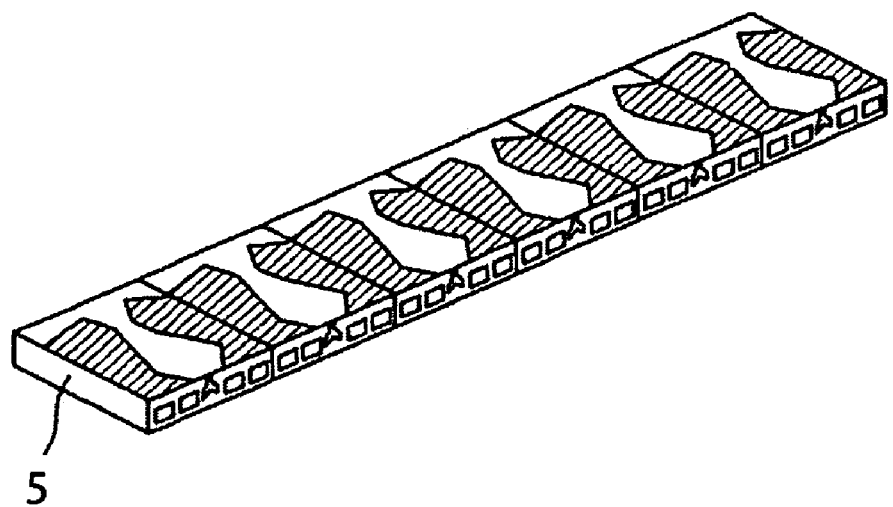

The sample 5 represents a hard disk write head, for example. A magnetic head may be measured as a divided slider (FIG. 27A) or as a raw bar (FIG. 27B). The raw bar contains multiple sliders concatenated with each other as provided at a manufacturing stage of hard disk magnetic heads. Measuring the raw bar can decrease the number of times to replace the sample and shorten the inspection time.

The present invention makes it possible to inspect two dimensional distribution of a magnetic field generated from a hard disk write head according to a nondestructive and contactless technique at an early stage of the manufacturing process while ensuring throughput capable of inspecting all products.

This invention may be embodied in other specific forms without departing from the spirit or essential characteristics thereof. The present embodiments are therefore to be considered in all aspects as illustrative and not restrictive, the scope of the invention being indicated by the appended claims rather than by the foregoing description and all changes which come within the meaning and range of equivalency of the claims are therefore intended to be embraced therein.

The invention claimed is:

1. A magnetic device inspection apparatus for detecting a magnetic field generated from a sample, the apparatus comprising:
   a cantilever having a magnetic material probe or a probe coated with a magnetic material;
   a sample base configured to hold the sample;
   a current applying unit configured to apply a current having a frequency ($f_E$) to the sample held on the sample base;
   a displacement detection unit configured to detect displacement at a tip of the cantilever;
   a movement unit configured to move the probe to approach, retract, and/or travel in relation to the sample; and
   wherein the current having a frequency ($f_E$) applied to the sample by the current applying unit is different from a resonance frequency (f) of the cantilever, and
   wherein the magnetic device inspection apparatus is configured to measure a distribution of a magnetic field generated from the sample.

2. The magnetic device inspection apparatus according to claim 1,
   wherein an alternating current without offset excites the sample and a frequency of the alternating current is equivalent to N/2 or 1/(2N) multiplied by resonance frequency (f) of the cantilever having the probe.

3. The magnetic device inspection apparatus according to claim 1,
   wherein an alternating current with offset excites the sample and a frequency of the alternating current is equivalent to N or 1/N multiplied by resonance frequency (f) of the cantilever having the probe.

4. The magnetic device inspection apparatus according to claim 1,
   wherein a carrier frequency for the alternating current is higher than a frequency for exciting the cantilever and an envelope frequency of the alternating current is equivalent to a vibration frequency capable of exciting the cantilever.

5. The magnetic device inspection apparatus according to claim 1,
   wherein a frequency of the alternating current is higher than a frequency for exciting the cantilever and an amplitude of the alternating current is cyclically amplitude-modulated at a frequency capable of displacing the cantilever.

6. The magnetic device inspection apparatus according to claim 1,
   wherein the cantilever is fixed to a vibration element and an oscillator vibrates the vibration element.

7. The magnetic device inspection apparatus according to claim 1,
   wherein the cantilever is vibrated by any one of: an elastic wave from outside a holding section for holding the cantilever; applying an alternating current to a capacitor including the cantilever and an electrode; and applying an alternate-current magnetic field to a magnetic material provided for part of the cantilever.

8. The magnetic device inspection apparatus according to claim 1, comprising:
   means for sweeping a frequency of the alternating current; and
   means for detecting a vibration frequency equivalent to a frequency of the alternating current.

9. The magnetic device inspection apparatus according to claim 1, comprising:
   means for generating a known magnetic field and maintaining a specified state for a magnetization condition of the probe at least part of which is coated with a magnetic material film or is made of a magnetic material.

10. The magnetic device inspection apparatus according to claim 1, comprising:
    means for including a standard coil for generating a given magnetic field or a magnetic material for calibration and calibrates a magnetic field intensity measured by the probe at least part of which is coated with a magnetic material film or is made of a magnetic material.

11. The magnetic device inspection apparatus according to claim 1,
    wherein a signal detects displacement at the tip of the cantilever vibrated by a magnetic field generated from the sample; and
    wherein the apparatus lock-in-detects the signal at a frequency (fE) of the current applied to the sample by the current applying unit and selectively detects only a response component relevant to excitation of the sample.

12. The magnetic device inspection apparatus according to claim 1,
    wherein, when observing a sample having fine irregularity on a surface of the sample, the apparatus previously corrects a slant of the sample surface using a quantity measured by an optical lever or contact with the probe and allows the probe to two-dimensionally scan along the corrected slant by maintaining a specified distance from a surface of the sample.

13. The magnetic device inspection apparatus according to claim 1,
    wherein optical interferometry or a scanning probe microscope is used to previously measure a surface slant and irregularity of the sample; and
    wherein the probe follows irregularity of the sample surface for scanning while maintaining a constant distance from the sample surface.

14. The magnetic device inspection apparatus according to claim 1,
    wherein a bright-field optical microscope or a dark-field optical microscope is used to previously detect a position and a size of a foreign particle on a sample surface; and
    wherein the probe two-dimensionally scans the sample surface with or without keeping a specified distance therefrom while avoiding the foreign particle.

15. The magnetic device inspection apparatus according to claim 1,
wherein the apparatus previously detects a position of the sample through contact with the sample outside a region including a measurement object, allows a probe to scan by keeping a distance specified after contact away from the sample, and performs contactless observation in the region including the measurement object of the sample.

16. The magnetic device inspection apparatus according to claim 1,
wherein the apparatus brings a probe into contact with the sample so as to apply a current for exciting the sample, thereby using a microscope or a telescope capable of observing a tip of the probe and an electrode surface of the sample from a rear or a side of the probe.

17. A magnetic device inspection apparatus for detecting a magnetic field generated from a sample, the apparatus comprising:
a cantilever having a magnetic material probe or a probe coated with a magnetic material;
a sample base configured to hold the sample;
a current applying unit configured to apply a current having a frequency ($f_E$) to the sample held on the sample base;
a displacement detection unit configured to detect displacement at a tip of the cantilever;
a movement unit configured to move the probe to approach, retract, and/or travel in relation to the sample; and
wherein the magnetic device inspection apparatus is configured to measure a distribution of a magnetic field generated from the sample; and
wherein the frequency ($f_E$) of the current a lied to the sample by the current applying unit is equivalent to N multiplied by resonance frequency (f) of the cantilever having the probe, wherein N is an integer equal to or greater than 2.

18. A magnetic device inspection apparatus for detecting a magnetic field generated from a sample, the apparatus comprising:
a cantilever having a magnetic material probe or a probe coated with a magnetic material;
a sample base configured to hold the sample;
a current applying unit configured to apply a current having a frequency ($f_E$) to the sample held on the sample base;
a displacement detection unit configured to detect displacement at a tip of the cantilever;
a movement unit configured to move the probe to approach, retract, and/or travel in relation to the sample; and
wherein the magnetic device inspection apparatus is configured to measure a distribution of a magnetic field generated from the sample; and
wherein the frequency ($f_E$) of the current applied to the sample by the current applying unit is equivalent to the reciprocal of N (1/N) multiplied by resonance frequency (f) of the cantilever having the probe, wherein N is an integer equal to or greater than 2.

* * * * *